(12) United States Patent
Zhou et al.

(10) Patent No.: US 12,518,506 B2
(45) Date of Patent: Jan. 6, 2026

(54) METHOD FOR OBTAINING LIGHT SOURCE SPECTRUM AND DEVICE

(71) Applicant: Huawei Technologies Co., Ltd., Shenzhen (CN)

(72) Inventors: Maosen Zhou, Shenzhen (CN); Yanlin Qian, Shenzhen (CN); Minggui He, Xi'an (CN); Kang Qian, Shanghai (CN); Yongxing Yang, Shenzhen (CN); Miaofeng Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 425 days.

(21) Appl. No.: 18/037,723

(22) PCT Filed: Nov. 19, 2021

(86) PCT No.: PCT/CN2021/131622
§ 371 (c)(1),
(2) Date: May 18, 2023

(87) PCT Pub. No.: WO2022/105850
PCT Pub. Date: May 27, 2022

(65) Prior Publication Data
US 2023/0410463 A1    Dec. 21, 2023

(30) Foreign Application Priority Data
Nov. 23, 2020   (CN) .......................... 202011325598.3

(51) Int. Cl.
*G06T 7/90*       (2017.01)
*G06V 10/143*   (2022.01)
(Continued)

(52) U.S. Cl.
CPC ................ *G06V 10/60* (2022.01); *G06T 7/90* (2017.01); *G06V 10/143* (2022.01); *G06V 10/56* (2022.01);
(Continued)

(58) Field of Classification Search
CPC ...... G06V 10/60; G06V 10/143; G06V 10/56; G06V 10/761; G06V 10/763;
(Continued)

(56) References Cited

U.S. PATENT DOCUMENTS

| | | |
|---|---|---|
| 9,307,214 B1 | 4/2016 | Liu et al. |
| 2011/0312374 A1 | 12/2011 | Chen et al. |

(Continued)

FOREIGN PATENT DOCUMENTS

| | | |
|---|---|---|
| CN | 102572211 A | 7/2012 |
| CN | 102948140 A | 2/2013 |

(Continued)

*Primary Examiner* — Duy M Dang
(74) *Attorney, Agent, or Firm* — Conley Rose, P.C.

(57) ABSTRACT

A method for obtaining a light source spectrum includes: obtaining first information in a current photographing scene, where the first information includes at least one of a first image generated by a red, green, and blue (RGB) sensor or a light intensity of light received by each pixel on a first multispectral sensor; inputting the first information into a first model to obtain a probability that a light source in the current photographing scene belongs to each type of light source; and determining a spectrum of the light source in the current photographing scene based on the probability that the light source in the current photographing scene belongs to each type of light source and a spectrum of each type of light source.

20 Claims, 16 Drawing Sheets

(51) Int. Cl.
  *G06V 10/56*    (2022.01)
  *G06V 10/60*    (2022.01)
  *G06V 10/74*    (2022.01)
  *G06V 10/762*   (2022.01)
  *G06V 10/764*   (2022.01)
  *G06V 10/774*   (2022.01)
  *H04N 23/88*    (2023.01)

(52) U.S. Cl.
  CPC .......... *G06V 10/761* (2022.01); *G06V 10/763* (2022.01); *G06V 10/764* (2022.01); *G06V 10/774* (2022.01); *H04N 23/88* (2023.01); *G06T 2207/10024* (2013.01); *G06T 2207/10036* (2013.01); *G06T 2207/20072* (2013.01); *G06T 2207/20076* (2013.01); *G06T 2207/20081* (2013.01)

(58) Field of Classification Search
  CPC .. G06V 10/764; G06V 10/774; G06V 10/762; G06V 20/00; G06V 10/82; G06T 7/90; G06T 2207/10024; G06T 2207/10036; G06T 2207/20072; G06T 2207/20076; G06T 2207/20081; G06T 1/20; H04N 23/88; H04N 9/31; H04N 23/16; H04N 23/70; H04N 9/3182; H04M 1/72439
  USPC ........................................................ 382/155
  See application file for complete search history.

(56)             References Cited

U.S. PATENT DOCUMENTS

2012/0155753 A1    6/2012  Masato
  2014/0267782 A1*   9/2014  Liu ..................... H04N 1/6077
                                                         348/187
  2019/0045163 A1    2/2019  Nikkanen et al.

FOREIGN PATENT DOCUMENTS

CN       105721845 A      6/2016
  CN       108388905 A      8/2018
  CN       110830794 A      2/2020
  CN       111294576 A      6/2020
  WO       2020172888 A1    9/2020

* cited by examiner

METHOD FOR OBTAINING LIGHT SOURCE SPECTRUM AND DEVICE

CROSS-REFERENCE TO RELATED APPLICATIONS

This is a U.S. National Stage of International Patent Application No. PCT/CN2021/131622 filed on Nov. 19, 2021, which claims priority to Chinese Patent Application No. 202011325598.3 filed on Nov. 23, 2020. Both of the aforementioned applications are hereby incorporated by reference in their entireties.

TECHNICAL FIELD

This application relates to the terminal field, and in particular, to a method for obtaining a light source spectrum and a device.

BACKGROUND

When a user takes a photo, a light intensity recorded by an RGB sensor is an integral result of a light source spectrum, an object material reflectivity spectrum, and a response function. When light sources are different, due to different light source spectra, light intensities recorded by the RGB sensor are different, and color values calculated based on the light intensities are also different. It can be learned that a color of an image is greatly affected by a light source. Impact of the light source may be removed through white balance processing and color correction processing, and the light source spectrum may be used for guiding the white balance processing and the color correction processing.

In the conventional technology, a multispectral sensor is added to a camera. After recording a light intensity of light received by each pixel, the multispectral sensor performs interpolation processing on the light intensity of the light received by each pixel, and uses a spectrum obtained through interpolation as a light source spectrum.

However, the light source spectrum obtained by using the foregoing method is essentially an integral result of the light source spectrum, the object material reflectivity spectrum, and the response function, and is not a pure light source spectrum. As a result, accuracy of the light source spectrum obtained by using the foregoing method is not high.

SUMMARY

Tis application provides a method for obtaining a light source spectrum and a device, to obtain a light source spectrum with higher accuracy.

According to a first aspect, this application provides a method for obtaining a light source spectrum, including: obtaining first information in a current photographing scene, where the first information includes at least one of the following: a first image generated by an RGB sensor or a light intensity of light received by each pixel on a first multispectral sensor; inputting the first information into a first model, to obtain a probability that a light source in the current photographing scene belongs to each type of light source; and determining a spectrum of the light source in the current photographing scene based on the probability that the light source in the current photographing scene belongs to each type of light source and a spectrum of each type of light source.

In a possible implementation, before the inputting the first information into a first model, to obtain a probability that a light source in the current photographing scene belongs to each type of light source, the method further includes: obtaining a training sample, where the training sample includes first information in different photographing scenes and light source types corresponding to light sources in the different photographing scenes; and training the first model by using the training sample.

In a possible implementation, the obtaining a training sample includes: constructing a data set, where the data set includes M×N groups of data, each group of data corresponds to a photographing scene, each photographing scene corresponds to a light source and a to-be-photographed object, M is a quantity of light sources, N is a quantity of to-be-photographed objects, and each group of data includes first information in a corresponding photographing scene; performing cluster analysis on spectra of the M light sources in the data set, to obtain a light source type corresponding to the light source in each photographing scene; and obtaining the training sample based on the first information in each group of data and the light source type corresponding to the light source in each photographing scene.

In a possible implementation, each group of data in the M×N groups of data further includes second information, and the second information includes a spectrum of a light source in a corresponding photographing scene and an object material reflectivity spectrum corresponding to each pixel on a second multispectral sensor in the corresponding photographing scene; and the performing cluster analysis on spectra of the M light sources in the data set, to obtain a light source type corresponding to the light source in each photographing scene includes: obtaining the second information in each group of data to obtain M×N groups of second information; and performing cluster analysis on the spectra of the M light sources in the data set based on the M×N groups of second information.

In a possible implementation, the performing cluster analysis on the spectra of the M light sources in the data set based on the M×N groups of second information includes: determining a classification standard of the M light sources in the data set based on the M×N groups of second information; and performing cluster analysis on the spectra of the M light sources in the data set based on the classification standard.

In a possible implementation, the determining a classification standard of the M light sources in the data set based on the M×N groups of second information includes: selecting, for each to-be-photographed object in the N to-be-photographed objects, any two groups of second information from M groups of second information corresponding to the to-be-photographed object, to obtain $N*C_M^2$ combinations; and calculating, for each combination, a two-dimensional data point corresponding to the combination, to obtain $N*C_M^2$ two-dimensional data points, where the two-dimensional data point includes an average color distance and a light source spectral similarity indicator; and determining the classification standard based on the $N*C_M^2$ two-dimensional data points.

In a possible implementation, the calculating, for each combination, a two-dimensional data point corresponding to the combination includes: calculating a first RGB value of each pixel based on one group of second information in the combination; calculating a second RGB value of each pixel based on the other group of second information in the combination; and determining, based on the first RGB value of each pixel and the second RGB value of each pixel, the average color distance corresponding to the combination.

In a possible implementation, the calculating, for each combination, a two-dimensional data point corresponding to the combination includes: determining, based on a spectrum of a light source included in one group of second information in the combination and a spectrum of a light source included in the other group of second information in the combination, the light source spectral similarity indicator corresponding to the combination.

In a possible implementation, the determining the classification standard based on the $N*C_M^2$ two-dimensional data points includes: drawing a two-dimensional intersection graph based on the $N*C_M^2$ two-dimensional data points; determining a first parameter from a horizontal coordinate of the two-dimensional intersection graph, so that a proportion of two-dimensional point data points whose vertical coordinates are less than a preset value and horizontal coordinates are less than the first parameter exceeds a preset threshold; and using the first parameter as the classification standard.

In a possible implementation, the performing cluster analysis on the spectra of the M light sources in the data set based on the classification standard includes: performing cluster analysis on the spectra of the M light sources in the data set by using a k-means clustering algorithm, where a light source spectral similarity indicator between any two cluster centers is greater than the classification standard, and in each cluster, a spectral similarity indicator between any two light sources is less than the classification standard.

In a possible implementation, the first model includes a first branch, and the first branch is configured to output the probability that the light source in the current photographing scene belongs to each type of light source; and the obtaining the training sample based on the first information in each group of data and the light source type corresponding to the light source in each photographing scene includes: using the first information in each group of data and the light source type corresponding to the light source m the corresponding photographing scene as a training sample.

In a possible implementation, the first model includes a first branch and a second branch, the first branch is configured to output the probability that the light source in the current photographing scene belongs to each type of light source, and the second branch is configured to output an object material reflectivity spectrum corresponding to each pixel in the current photographing scene, and the obtaining the training sample based on the first information in each group of data and the light source type corresponding to the light source in each photographing scene includes: using the first information in each group of data, the light source type corresponding to the light source in the corresponding photographing scene, and the object material reflectivity spectrum corresponding to each pixel on the second multispectral sensor in the corresponding photographing scene as a training sample.

In a possible implementation, the first branch includes a first structure and a fully connected layer, the first structure is converted into the fully connected layer through downsampling for L times, the first structure includes a convolutional layer, an activation function, and a maximum pooling layer, a loss function of the first branch is cross entropy, and L is greater than or equal to 1; and the second branch includes P residual blocks, each residual block includes a first convolutional layer, a first activation function, a second convolutional layer, and a second activation function, a loss function of the second branch is L2, and P is greater than or equal to 1.

In a possible implementation, the determining a spectrum of the light source in the current photographing scene based on the probability that the light source in the current photographing scene belongs to each type of light source and a spectrum of each type of light source includes: performing summation on the spectrum of each type of light source by using the probability that the light source in the current photographing scene belongs to each type of light source as a weighted sun weight, to obtain the spectrum of the light source in the current photographing scene.

According to a second aspect, this application provides an electronic device, including an RGB sensor, a multi-spectral sensor, and a processor. The processor is configured to obtain first information in a current photographing scene. The first information includes at least one of the following: a first image generated by the RGB sensor or a light intensity of light received by each pixel on the multispectral sensor. The processor is further configured to input the first information into a first model, to obtain a probability that a light source in the current photographing scene belongs to each type of light source. The processor is further configured to determine a spectrum of the light source in the current photographing scene based on the probability that the light source in the current photographing scene belongs to each type of light source and a spectrum of each type of light source.

In a possible implementation, before inputting the first information into the first model, the processor is further configured to: obtain a training sample, where the training sample includes first information in different photographing scenes and light source types corresponding to light sources in the different photographing scenes; and train the first model by using the training sample.

In a possible implementation, the processor is specifically configured to: construct a data set, where the data set includes M×N groups of data, each group of data corresponds to a photographing scene, each photographing scene corresponds to a light source and a to-be-photographed object, M is a quantity of light sources, N is a quantity of to-be-photographed objects, and each group of data includes first information in a corresponding photographing scene; perform cluster analysis on spectra of the M light sources in the data set, to obtain a light source type corresponding to the light source in each photographing scene; and obtain the training sample based on the first information in each group of data and the light source type corresponding to the light source in each photographing scene.

In a possible implementation, each group of data in the M×N groups of data further includes second information, and the second information includes a spectrum of a light source in a corresponding photographing scene and an object material reflectivity spectrum corresponding to each pixel on a second multispectral sensor in the corresponding photographing scene. The processor is specifically configured to: obtain the second information in each group of data to obtain M×N groups of second information; and perform cluster analysis on the spectra of the M light sources in the data set based on the M×N groups of second information.

In a possible implementation, the processor is specifically configured to: determine a classification standard of the M light sources in the data set based on the M×N groups of second information; and perform cluster analysis on the spectra of the M light sources in the data set based on the classification standard.

In a possible implementation, the processor is specifically configured to: select, for each to-be-photographed object in the N to-be-photographed objects, any two groups of second information from M groups of second information corresponding to the to-be-photographed object, to obtain $N*C_M^2$ combinations; calculate, for each combination, a two-dimensional data point corresponding to the combination, to obtain $N*C_M^2$ two-dimensional data points, where the two-dimensional data point includes an average color distance and a light source spectral similarity indicator; and determine the classification standard based on the $N*C_M^2$ two-dimensional data points.

In a possible implementation, the processor is specifically configured to: calculate a first RGB value of each pixel based on one group of second information in the combination; calculate a second RGB value of each pixel based on the other group of second information in the combination; and determine, based on the first RGB value of each pixel and the second RGB value of each pixel, the average color distance corresponding to the combination.

In a possible implementation, the processor is specifically configured to: determine, based on a spectrum of a light source included in one group of second information in the combination and a spectrum of a light source included in the other group of second information in the combination, the light source spectral similarity indicator corresponding to the combination.

In a possible implementation, the processor is specifically configured to: draw a two-dimensional intersection graph based on the $N*C_M^2$ two-dimensional data points; determine a first parameter from a horizontal coordinate of the two-dimensional intersection graph, so that a proportion of two-dimensional point data points whose vertical coordinates are less than a preset value and horizontal coordinates are less than the first parameter exceeds a preset threshold; and use the first parameter as the classification standard.

In a possible implementation, the processor is specifically configured to: perform cluster analysis on the spectra of the M light sources in the data set by using a k-means clustering algorithm, where a light source spectral similarity indicator between any two cluster centers is greater than the classification standard, and in each cluster, a spectral similarity indicator between any two light sources is less than the classification standard.

In a possible implementation, the first model includes a first branch, and the first branch is configured to output the probability that the light source in the current photographing scene belongs to each type of light source. The processor is specifically configured to: use the first information in each group of data and the light source type corresponding to the light source in the corresponding photographing scene as a training sample.

In a possible implementation, the first model includes a first branch and a second branch, the first branch is configured to output the probability that the light source in the current photographing scene belongs to each type of light source, and the second branch is configured to output an object material reflectivity spectrum corresponding to each pixel in the current photographing scene. The processor is specifically configured to: use the first information in each group of data, the light source type corresponding to the light source in the corresponding photographing scene, and the object material reflectivity spectrum corresponding to each pixel on the second multispectral sensor in the corresponding photographing scene as a training sample.

In a possible implementation, the first branch includes a first structure and a fully connected layer, the first structure is converted into the fully connected layer through down-sampling for L times, the first structure includes a convolutional layer, an activation function, and a maximum pooling layer, a loss function of the first branch is cross entropy, and L is greater than or equal to 1; and the second branch includes P residual blocks, each residual block includes a first convolutional layer, a first activation function, a second convolutional layer, and a second activation function, a loss function of the second branch is L2, and P is greater than or equal to 1.

In a possible implementation, the processor is specifically configured to: perform summation on the spectrum of each type of light source by using the probability that the light source in the current photographing scene belongs to each type of light source as a weighted sum weight, to obtain the spectrum of the light source in the current photographing scene.

According to a third aspect, this application provides an electronic device, including: an RGB sensor, a multispectral sensor, a memory, and a processor. The RGB sensor is configured to generate a first image in a current photographing scene, the multispectral sensor is configured to record a light intensity of light received by each pixel on the multispectral sensor, and the processor is configured to be coupled to the memory, and read and execute instructions in the memory, to implement the method according to the first aspect.

According to a fourth aspect, this application provides a readable storage medium. The readable storage medium stores a computer program. When the computer program is executed, the method according to the first aspect is implemented.

This application provides a method for obtaining a light source spectrum and a device. After a user triggers to turn on a camera of a terminal device, an RGB sensor on a mobile phone generates an original image of a current photographing scene. In addition, a multispectral sensor on the mobile phone records a light intensity of light received by each pixel on the multispectral sensor, and inputs the original image generated by the RGB sensor and/or the light intensity of the light received by each pixel on the multispectral sensor into a pre-trained model. The model outputs a probability that a light source in the current photographing scene belongs to each type of light source, uses the probability as a weighted sum weight, and determines a spectrum of the light source in the current photographing scene based on the weighted sum weight and a spectrum of each type of light source. Because a light source spectrum obtained by using this method is close to a real light source spectrum, by performing white balance processing and color correction processing based on the light source spectrum, a color of an image is closer to a real color of a to-be-photographed object, thereby improving user experience.

DESCRIPTION OF EMBODIMENTS

Figure 1:
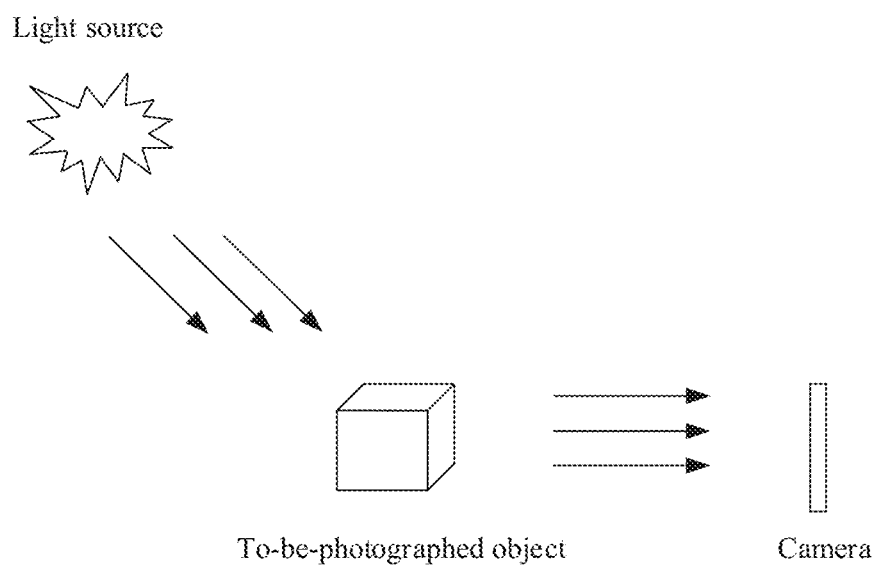
FIG. 1 is a diagram of an application scenario according to an embodiment of this application.
Figure 2:
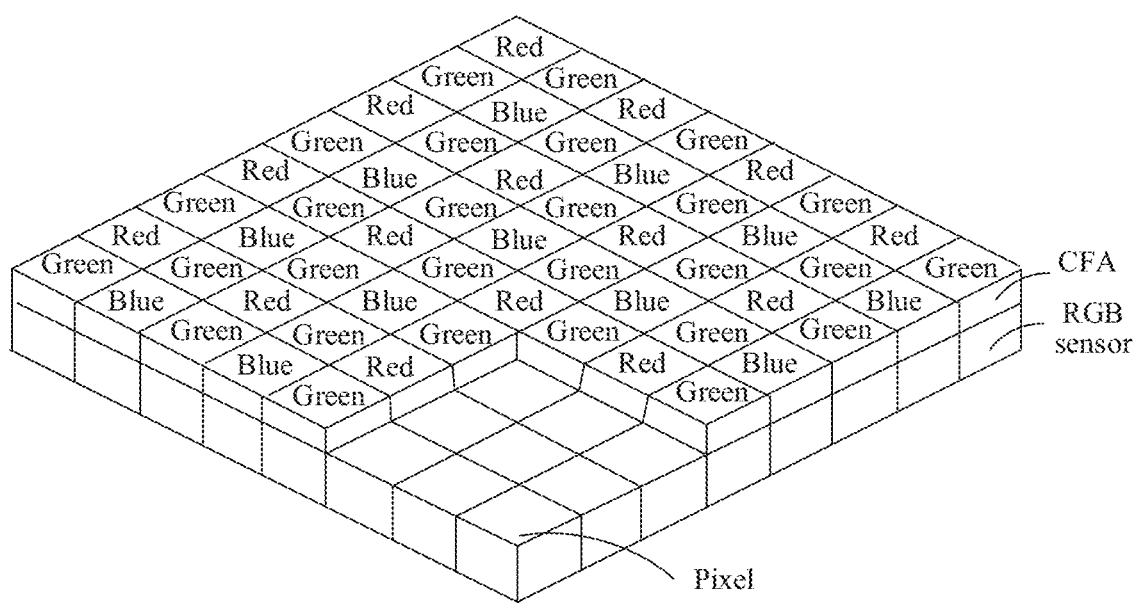
FIG. 2 is a first schematic diagram of an RGB sensor according to an embodiment of tins application.
Figure 3:
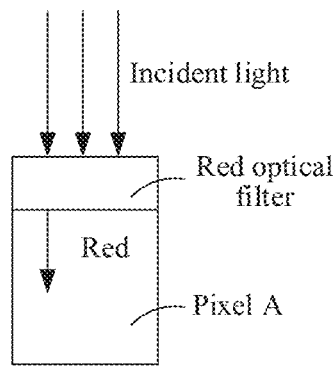
FIG. 3 is a second schematic diagram of an RGB sensor according to an embodiment of this application.

FIG. 1 is a diagram of an application scenario according to an embodiment of this application. Refer to FIG. 1. When a user takes a photo, light emitted by a light source is illuminated on a to-be-photographed object, and reflected light of the to-be-photographed object is incident on a camera. Refer to FIG. 2. A color filter array (Color Filter Array CFA) and an RGB sensor are disposed in the camera. The CFA is disposed on the RGB sensor. The CFA includes optical filters in three colors: red, green and blue. The optical filters in three colors may be arranged in a manner shown in FIG. 2. The RGB sensor is divided into a plurality of pixels. The optical filters on the CFA are in a one-to-one correspondence with the pixels on the RGB sensor. Refer to FIG. 3. A red optical filter is used as an example. Assuming that the red optical filter corresponds to a pixel A, through being filtered by the red optical filter, only red light can reach the pixel A. Therefore, a color channel corresponding to the pixel A is a red channel. The RGB sensor is configured to record a light intensity of light received by each pixel.

In FIG. 2, the light intensity recorded by the RGB sensor satisfies Formula 1:

$$I_c = \int_0^\lambda L(\lambda) R(\lambda, x) C_c(\lambda) d\lambda \quad \text{(Formula 1)}$$

c represents a color channel corresponding to a pixel x, $I_c$ represents a light intensity of light received by the pixel x recorded by the RGB sensor, $L(\lambda)$ is a light source spectrum. $R(\lambda, x)$ is an object material reflectivity spectrum corresponding to the pixel x, and $C_c(\lambda)$ is a response function of c. The response function of c refers to a function m which a ratio of a light intensity recorded by the RGB sensor to a light intensity of incident light varies with a wavelength, and $C_c(\lambda)$ is obtained by calibration during development of a terminal device.

Figure 3A:
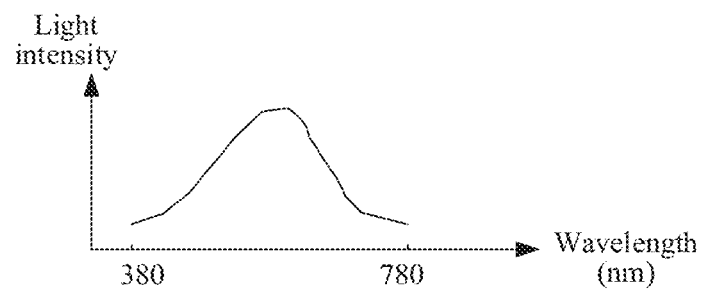
FIG. 3A is a schematic diagram of a light source spectrum according to an embodiment of this application.

The light source spectrum $L(\lambda)$ refers to a curve in which a light intensity of a light source varies with a wavelength within a wavelength range corresponding to the light source. For example, as shown in FIG. 3A, a wavelength range corresponding to a fluorescent lamp is 380 nm to 780 nm, and a curve in which a light intensity of the fluorescent lamp varies with a wavelength is a curve shown in FIG. 3A. In this case, the curve shown in FIG. 3A is referred to as a light source spectrum of the fluorescent lamp.

It can be seen from Formula 1 that the light intensity recorded by the RGB sensor is an integral result of the light source spectrum, the object material reflectivity spectrum, and the response function. When light sources are different, light intensities recorded by the RGB sensor are different due to different light source spectra, and color values calculated based on the light intensities are also different. The color values are for rendering to form an image. It can be seen that a color of the image formed by rendering is affected by a light source. For example, when a white object is illuminated by the fluorescent lamp, a color of an image formed by rendering is close to a color of the object itself. However, when the white object is placed under illumination of a red light emitting diode (Light Emitting Diode, LED) lamp, because a light source changes, the color of the image formed by rendering is reddish due to the red LED lamp.

In some embodiments, for each pixel, the RGB sensor converts a light intensity of light received by the pixel into a color value of a color channel corresponding to the pixel, and uses a color value of a color channel corresponding to a surrounding pixel as a color value of another color channel of the pixel, to obtain an RGB value of the pixel. The RGB sensor transmits the RGB value of each pixel to an image signal processing (Image Signal Processing, ISP) module. The ISP module performs white balance processing and color correction processing on the RGB value of each pixel output by the RGB sensor. The white balance processing is for removing impact of the light source and avoiding color cast caused by the light source. The color correction processing is for converting the RGB value of each pixel into a standard observer space (CIE XYZ) after the white balance processing. An accurate light source spectrum can guide the foregoing two processing processes.

In some embodiments, the light source spectrum is obtained in the following manners.

Figure 3B:
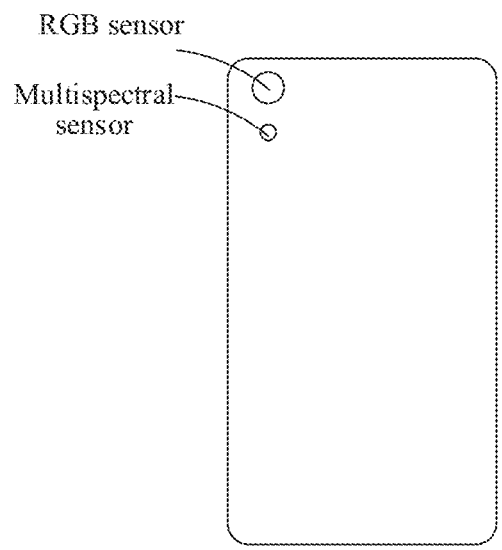
FIG. 3B is a schematic diagram of an RGB sensor and a multispectral sensor according to an embodiment of this application.
Figure 4:
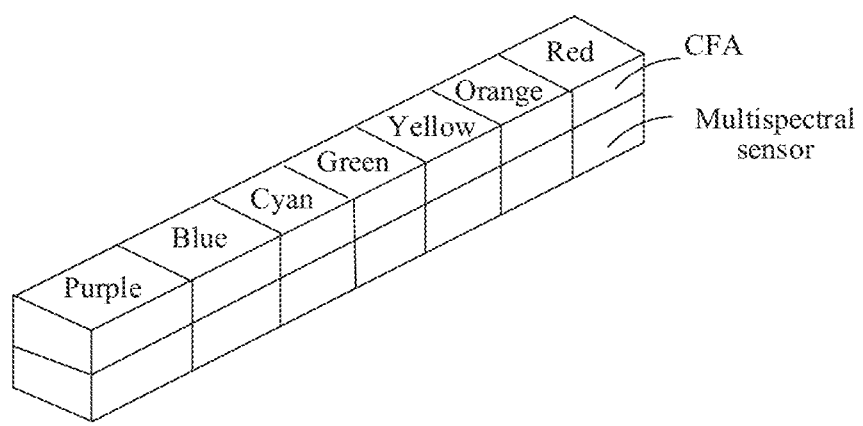
FIG. 4 is a schematic diagram of a multispectral sensor according to an embodiment of this application.

Refer to FIG. 3B. A multispectral sensor is added to the camera. The multispectral sensor and the RGB sensor may share a same group of lenses, or the multispectral sensor and the RGB sensor each have an independent lens. In FIG. 3B, an example in which the multispectral sensor and the RGB sensor each have an independent lens is used for illustration, and the multispectral sensor and the RGB sensor are disposed behind their lenses respectively. Refer to FIG. 4. Similar to the RGB sensor, a CFA is also disposed on the multispectral sensor, and light is incident on the CFA through a lens. Different from the CFA on the RGB sensor, the CFA on the multispectral sensor includes optical filters in a plurality of colors. In FIG. 4, an example in which the CFA includes optical filters in eight colors: red, orange, yellow, green, cyan, blue, and purple is used for illustration.

Similar to the RGB sensor, the multispectral sensor may record the light intensity of light received by each pixel. Refer to FIG. 4. Each pixel corresponds to a color channel, and the light intensity of light received by each pixel is used as a light intensity of a corresponding color channel, so that light intensities of eight color channels may be obtained. The light intensities of the eight color channels are drawn together to obtain eight discrete points shown in FIG. 5. A curve of a light intensity varying with a wavelength may be obtained by performing interpolation processing on the eight discrete points shown in FIG. 5, and the curve is used as the light source spectrum.

However, the light intensity recorded by the multispectral sensor also satisfies Formula 1. The light source spectrum obtained by using the foregoing method is essentially an integral result of the light source spectrum, the object material reflectivity spectrum, and the response function, and is not a pure light source spectrum. As a result, accuracy of the light source spectrum obtained by using the foregoing method is not high.

To resolve the foregoing technical problem, an embodiment of this application provides a method for obtaining a light source spectrum. The method for obtaining a light source spectrum is applied to a terminal device configured with an RGB sensor and a multispectral sensor. The terminal device includes but is not limited to a mobile phone, a tablet computer, a notebook computer, a smart screen, a digital camera, and the like. A mobile phone is used as an example. A user triggers to turn on a camera of the mobile phone, through which an RGB sensor on the mobile phone generates an original image of a current photographing scene. In addition, a multispectral sensor on the mobile phone records a light intensity of light received by each pixel on the multispectral sensor, and inputs the original image generated by the RGB sensor and/or the light intensity of the light received by each pixel recorded by the multispectral sensor into a pre-trained model. The model outputs a probability that a light source in the current photographing scene belongs to each type of light source, uses the probability as a weighted sum weight, and determines a spectrum of the light source in the current photographing scene based on the weighted sum weight and a spectrum of each type of light source. A light source spectrum obtained by using the method is close to a real light source spectrum. By performing white balance processing and color correction processing based on the light source spectrum, a color of an image is closer to a real color of a to-be-photographed object, thereby improving user experience.

Figure 6:
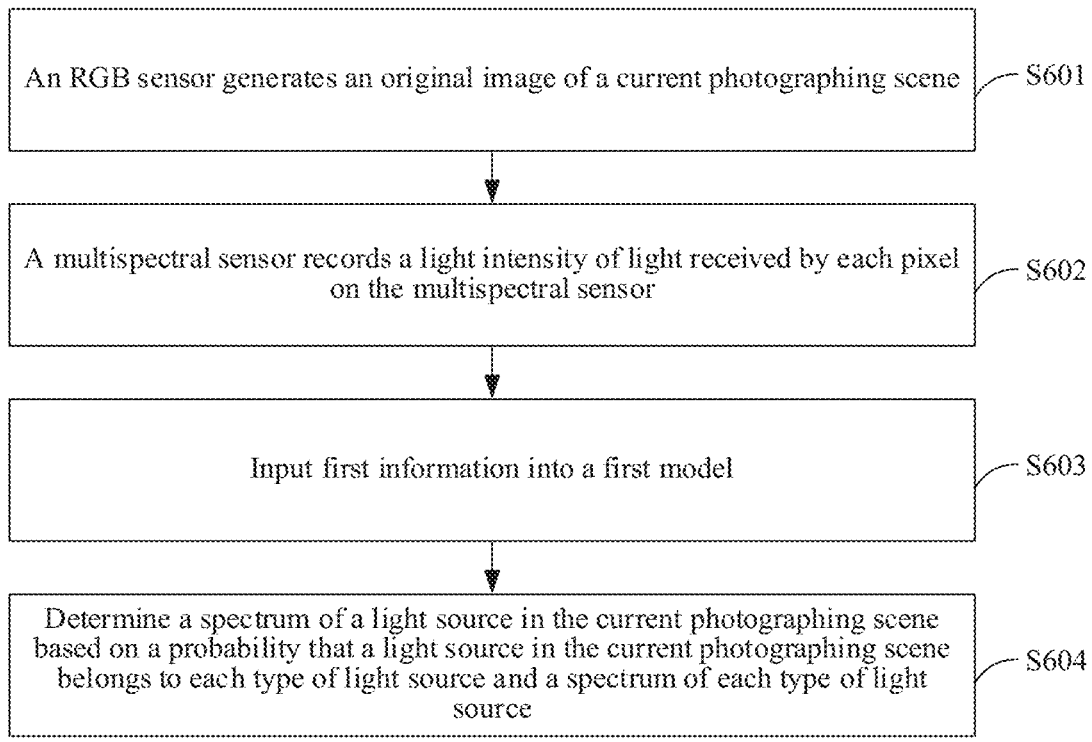
FIG. 6 is a flowchart of an embodiment of a method for obtaining a light source spectrum according to this application.

FIG. 6 is a flowchart of an embodiment of a method for obtaining a light source spectrum according to this application. As shown in FIG. 6, the method for obtaining a light source spectrum according to this embodiment is applied after a user triggers to turn on a camera of a terminal device, and the method further includes the following steps.

S601: An RGB sensor generates an original image of a current photographing scene.

The original image of the current photographing scene is a picture generated based on an RGB value of each pixel on the RGB sensor. In this embodiment of this application, the original image of the current photographing scene is referred to as a first image in the current photographing scene.

For each pixel, the RGB sensor converts a light intensity of light received by the pixel into a color value of a color channel corresponding to the pixel, and uses a color value of a color channel corresponding to a surrounding pixel as a color value of another color channel of the pixel, to obtain an RGB value of the pixel.

An example is as follows.

Figure 7:
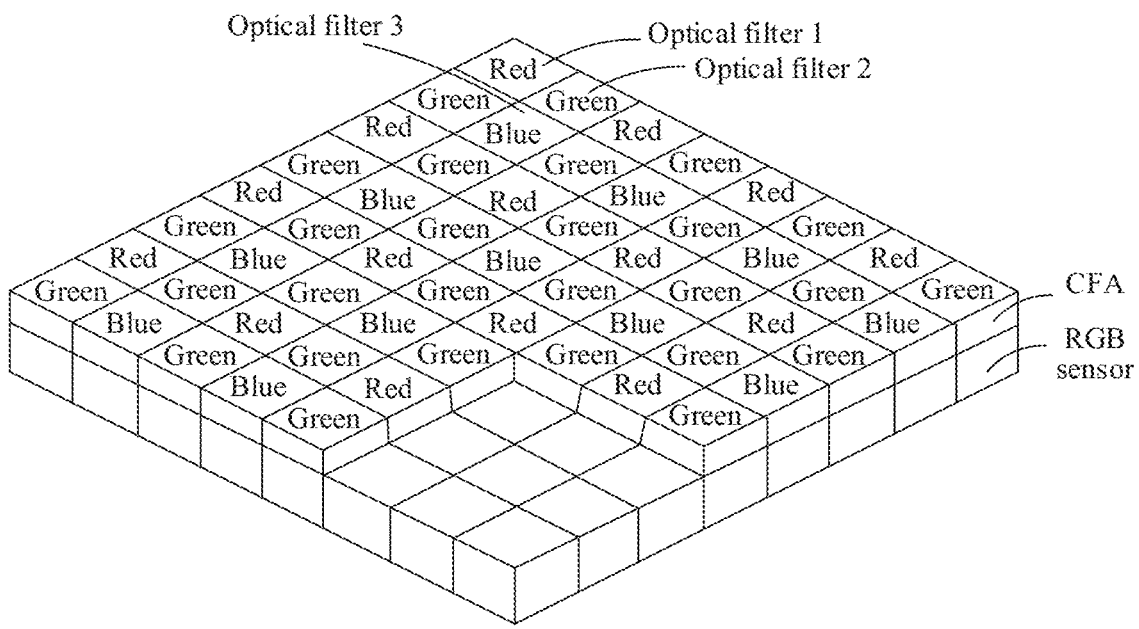
FIG. 7 is a principle diagram of calculating an RGB value of each pixel on an RGB sensor according to this application.

As shown in FIG. 7, a color of an optical filter 1 is red, a color of an optical filter 2 is green, and a color of an optical filter 3 is blue. The optical filter 1 corresponds to a pixel A on the RGB sensor, the optical filter 2 corresponds to a pixel B on the RGB sensor, and the optical filter 3 corresponds to a pixel C on the RGB sensor. The RGB sensor converts a light intensity of light received by the pixel A, to obtain an R value of the pixel A; converts a light intensity of light received by the pixel B, to obtain a G value of the pixel B; and converts a light intensity of light received by the pixel C, to obtain a B value of the pixel C. The G value of the pixel B may be used as a G value of the pixel A, and the B value of the pixel C may be used as a B value of the pixel A. In this case, an RGB value of the pixel A is (R1, G1, B1).

S602: A multispectral sensor records a light intensity of light received by each pixel on the multispectral sensor.

In S602, the multispectral sensor is a multispectral sensor configured in the terminal device. For ease of differentiation, the multispectral sensor is referred to as a first multispectral sensor below.

S603: Input first information into a first model, to obtain a probability that a light source in the current photographing scene belongs to each type of light source.

The first information includes at least one of the following: the first image generated by the RGB sensor or the light intensity of the light received by each pixel on the first multispectral sensor.

It should be noted that only the original image of the current photographing scene may be input into the first model, or only the light intensity of the light received by each pixel on the first multispectral sensor may be input into the first model, or both the original image of the current photographing scene and the light intensity of the light received by each pixel on the first multispectral sensor may be input into the first model.

Before S603, the first model needs to be trained. First, a training sample is obtained, where the training sample includes first information in different photographing scenes and light source types corresponding to light sources in the different photographing scenes. Then, the first model is trained by using the training sample.

The following describes a process of obtaining a training sample.

There are many known light sources, and a spectrum of a light source is very similar to a spectrum of another light source. Therefore, to reduce calculation pressure of the first model, the known light sources may be classified, and a training sample is obtained based on a classification result and a pre-constructed data set.

The following describes a process of constructing a data set, a process of classifying known light sources, and a process of obtaining a training sample based on a classification result and a data set one by one.

The following first describes the process of constructing a data set.

Figure 8:
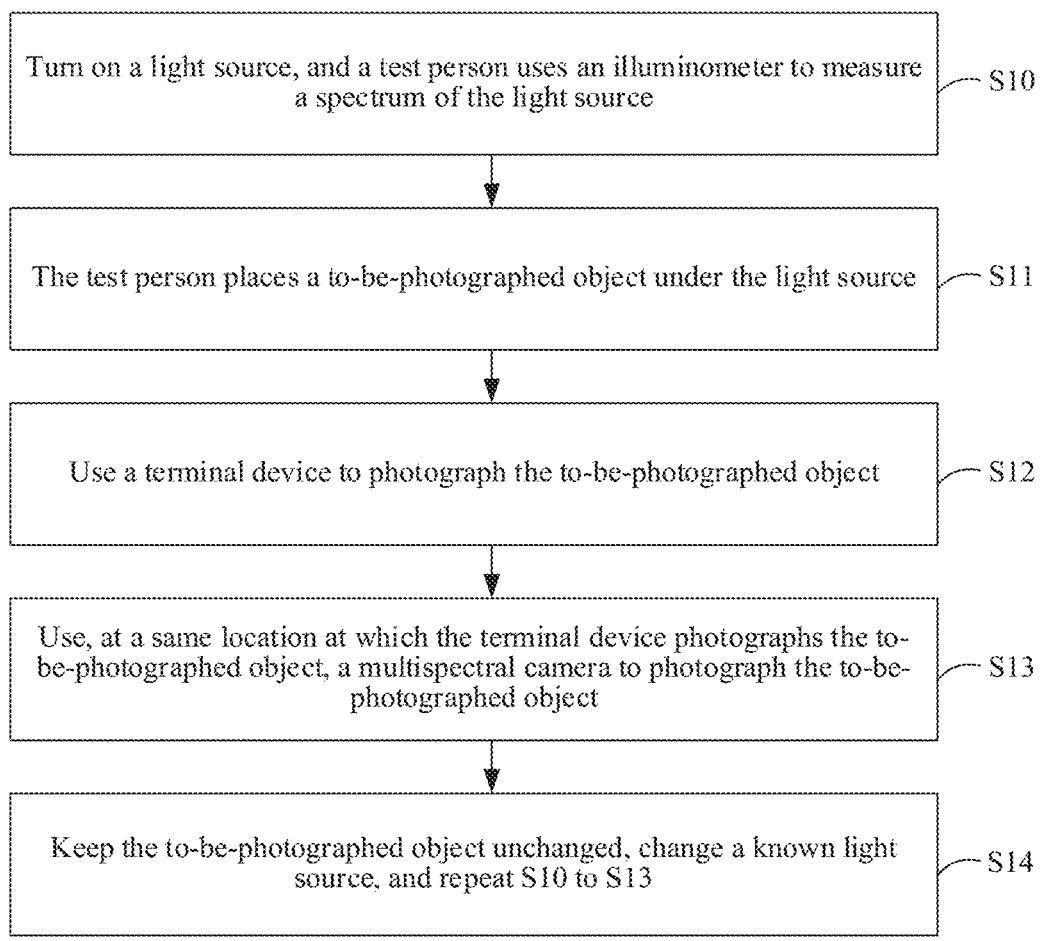
FIG. 8 is a flowchart of constructing a data set according to an embodiment of this application.

In a development process of the terminal device, for any known light source, including but not limited to: daylight, a shadow, a cloudy day, a tungsten filament lamp, a white fluorescent lamp, or a flash, the following operations are performed, as shown in FIG. 8.

S10: Turn on a light source, and a test person uses an illuminometer to measure a spectrum of the light source.

The spectrum measured by the illuminometer is used in a subsequent process of classifying light sources.

S11: The test person places a to-be-photographed object under the light source.

In a possible implementation, the to-be-photographed object is placed right below the light source. The light source used in S10 and the to-be-photographed object used in S11 form a photographing scene.

S12: Use the terminal device to photograph the to-be-photographed object.

Figure 9:
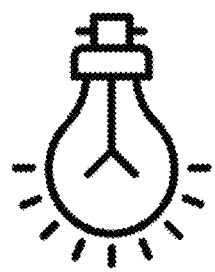
FIG. 9 is a first schematic diagram of a photographing scene according to an embodiment of this application.
Figure 9:
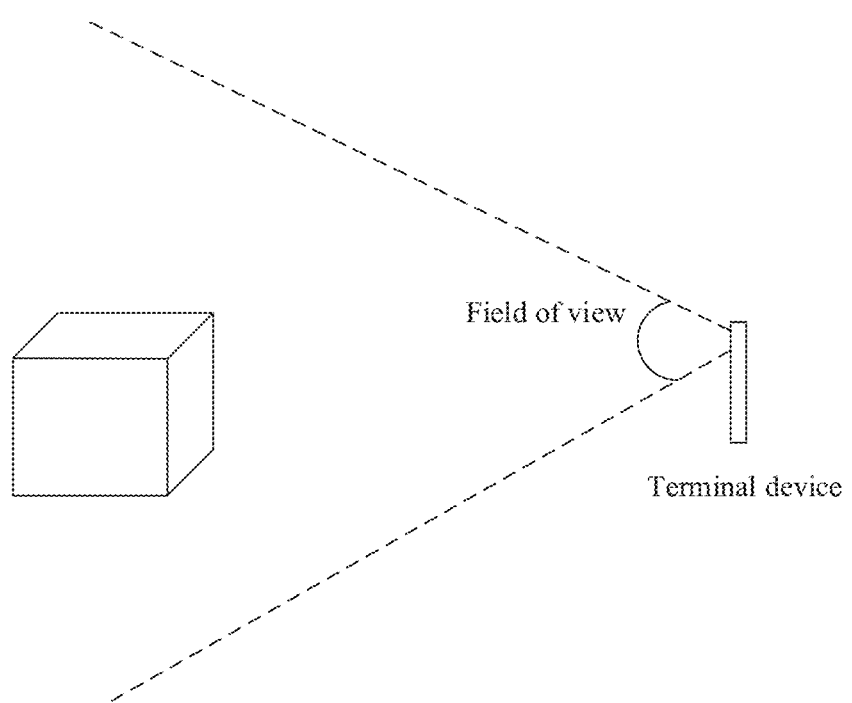

Refer to FIG. 9. The terminal device may directly face the to-be-photographed object, and a field of view of the terminal device is adjusted, so that the to-be-photographed object is within a photographing range corresponding to the field of view of the terminal device, and then photographing is triggered.

An original image is obtained from an RGB sensor of the terminal device, and a light intensity of light received by each pixel on a first multispectral sensor is obtained from the first multispectral sensor. The original image and the light intensity of the light received by each pixel are used in a subsequent process of obtaining a training sample. For a process in which the RGB sensor generates the original image, refer to S601. Details are not described herein again in this embodiment.

S13: Use, at a same location at which the terminal device photographs the to-be-photographed object, a multispectral camera to photograph the to-be-photographed object.

A multispectral image obtained through photographing by the multispectral camera is processed to obtain an object material reflectivity spectrum corresponding to each pixel on the multispectral sensor in a spectral camera, and the object material reflectivity spectrum is used in a subsequent process of classifying light sources.

In a possible implementation, a multispectral sensor is disposed in the multispectral camera. For ease of differentiation, the multispectral sensor is referred to as a second multispectral sensor. A size of the second multispectral sensor is the same as a size of the RGB sensor, and pixels on the second multispectral sensor are in a one-to-one correspondence with pixels on the RGB sensor. The object material reflectivity spectrum corresponding to each pixel on the second multispectral sensor may be obtained through inverse deduction by using Formula 1. Specifically, a color value of a color channel corresponding to each pixel on the second multispectral sensor is extracted from the multispectral image, and a light intensity IC of the color channel corresponding to each pixel is obtained through inverse deduction based on the color value of the color channel corresponding to each pixel. $L(\lambda)$ is obtained through measurement in S10, and as described above, $C_c(\lambda)$ is known. In this case, the object material reflectivity spectrum corresponding to each pixel on the second multispectral sensor may be obtained through inverse deduction by using Formula 1.

Figure 10:
FIG. 10 is a second schematic diagram of a photographing scene according to an embodiment of this application.
Figure 10:
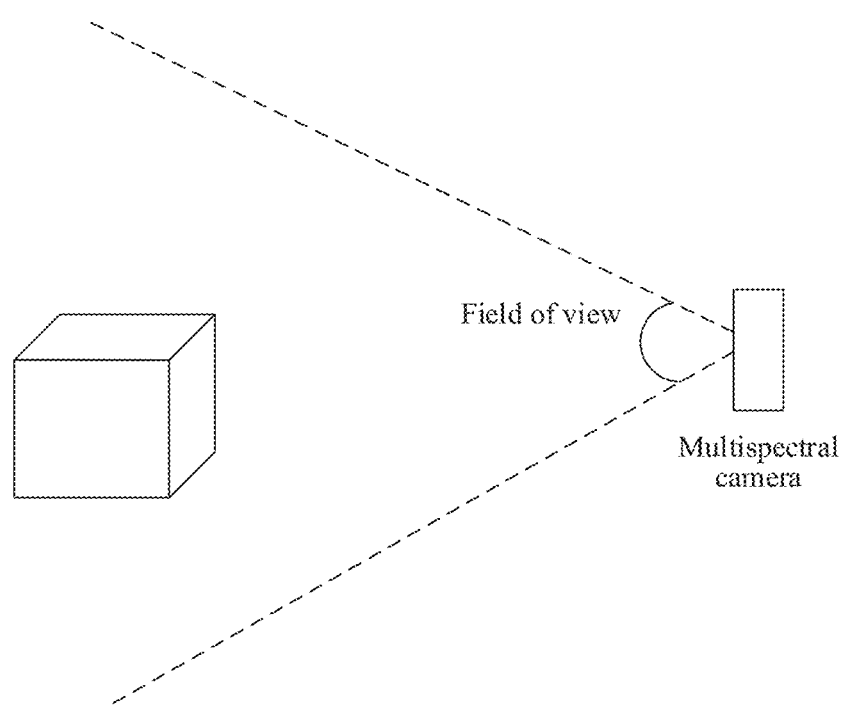

As shown in FIG. 10, before the to-be-photographed object is photographed by using the multispectral camera, a field of view of the multispectral camera is adjusted to the field of view used when the terminal device photographs the to-be-photographed object, a photographing angle of the multispectral camera is adjusted to a photographing angle used when the terminal device photographs the to-be-photographed object, and then photographing is triggered.

Through a collection process of S10 to S13, a group of data is obtained. The group of data includes first information and second information in a corresponding photographing scene, and the second information includes a spectrum of a light source in the corresponding photographing scene and the object material reflectivity spectrum corresponding to each pixel on the second multispectral sensor in the corresponding photographing scene. The original image generated by the RGB sensor and the light intensity, recorded by the first multispectral sensor, of the light received by each pixel on the first multispectral sensor are for subsequently obtaining a training sample. The spectrum measured by the illuminometer and the object material reflectivity spectrum corresponding to each pixel on the second multispectral sensor are for classifying known light sources.

S14: Keep the to-be-photographed object unchanged, change the known light source, and repeat S10 to S13.

In this embodiment of this application, assuming that there are M light sources, M groups of data corresponding to a same to-be-photographed object may be obtained through S11 to S14. The to-be-photographed object is changed, and S11 to S14 are repeated to obtain M groups of data corresponding to another to-be-photographed object. Assuming that there are N types of to-be-photographed objects, M×N groups of data may be obtained. The M×N groups of data form the foregoing data set. Each group of data corresponds to a photographing scene, and each photographing scene corresponds to a light source and a to-be-photographed object.

The foregoing is the process of constructing a data set.

The following describes the process of classifying known light sources.

In a possible implementation, refer to the foregoing process of constructing a data set. There are M light sources in the data set, and classifying the known light sources means performing cluster analysis on spectra of the M light sources, to obtain a light source type corresponding to the light source in each photographing scene in the data set.

When the cluster analysis is performed on the spectra of the M light sources, second information in each group of data is obtained from the data set to obtain M×N groups of second information, and the cluster analysis is performed on the spectra of the M light sources in the data set based on the M×N groups of second information.

Specifically, a classification standard of the M light sources in the data set is first determined based on the M×N groups of second information, and then the cluster analysis is performed on the spectra of the M light sources in the data set based on the classification standard.

The following describes a process of determining a classification standard and a process of performing cluster analysis on spectra of M light sources based on the classification standard one by one.

The following describes the process of determining a classification standard.

For each to-be-photographed object in N types of to-be-photographed objects, any two groups in M groups of second information corresponding to the to-be-photographed object are selected to obtain $N*C_M^2$ combinations. For each combination, a corresponding two-dimensional data point is calculated by using a method provided below. The two-dimensional data point includes an average color distance and a light source spectral similarity indicator, and the classification standard is determined based on $N*C_M^2$ two-dimensional data points.

The following describes a process of calculating a two-dimensional data point.

Using a combination as an example, an average color distance corresponding to the combination and a light source spectral similarity indicator corresponding to the combination form a two-dimensional data point of the combination. Therefore, the process of calculating a two-dimensional data point includes calculation in two aspects: The average color distance corresponding to the pair combination is calculated, where the average color distance reflects a color difference between two images; and the light source spectral similarity indicator corresponding to the combination is calculated.

Figure 11:
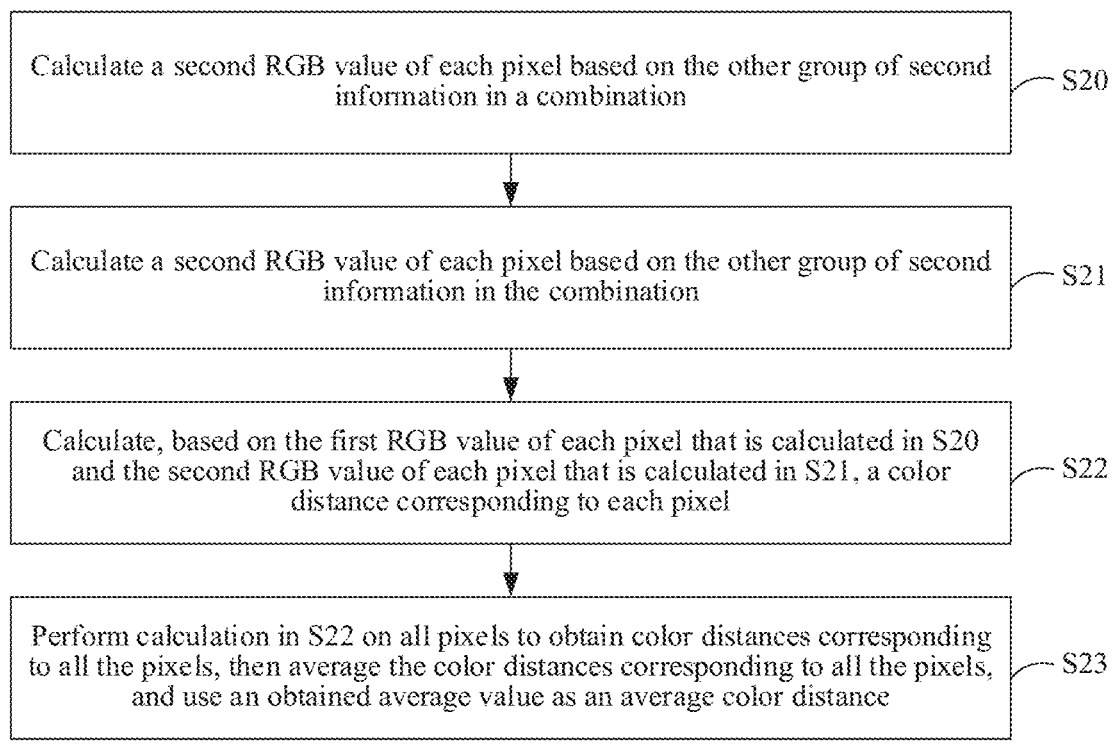
FIG. 11 is a flowchart of a process of calculating an average color distance according to an embodiment of this application.

Refer to FIG. 11. The following describes a process of calculating an average color distance.

S20: Calculate a first RGB value of each pixel based on one group of second information in the combination.

First, a light intensity corresponding to each pixel is calculated by using the following formula:

$$I_c = \int_0^\lambda L(\lambda) R(\lambda, x) C_c(\lambda) d\lambda$$

c represents a color channel corresponding to a pixel x, $I_c$ represents a light intensity corresponding to the pixel x, $L(\lambda)$ represents a spectrum of a light source in the group of second information, and $R(\lambda, x)$ represents an object material reflectivity spectrum corresponding to each pixel on a second multispectral sensor in the group of second information. $C_c(\lambda)$ is a response function of c.

Then, the light intensity corresponding to each pixel is converted to obtain a color value of a color channel corresponding to each pixel, and for each pixel, a color value of a color channel corresponding to a surrounding pixel is used as a color value of another color channel of the pixel, to obtain the first RGB value of the pixel. For a specific process, refer to S601. Details are not described in this application again.

S21: Calculate a second RGB value of each pixel based on the other group of second information in the combination.

A manner of calculating the second RGB value of each pixel based on the other group of second information is similar to that in S20. Details are not described in this application again.

S22: Calculate, based on the first RGB value of each pixel that is calculated in S20 and the second RGB value of each pixel that is calculated in S21, a color distance corresponding to each pixel.

For any pixel, a color distance corresponding to the pixel is calculated by using the following formula:

$$L = \cos^{-1}\left(\frac{R1R2 + G1G2 + B1B2}{\sqrt{R1^2 + G1^2 + B1^2}\sqrt{R2^2 + G2^2 + B2^2}}\right)$$

(R1, G1, B1) is an RGB value of each pixel that is calculated in S20, and (R2, G2, B2) is an RGB value of each pixel that is calculated in S21.

S23: Perform calculation in S22 on all pixels to obtain color distances corresponding to all the pixels, then average the color distances corresponding to all the pixels, and use an obtained average value as the foregoing average color distance.

The foregoing is the process of calculating an average color distance.

The following describes a process of calculating a light source spectral similarity indicator.

A light source spectral similarity indicator corresponding to a combination may be calculated by using the following formula:

$$RMSE = \sqrt{\frac{1}{N}\sum_{i=1}^{N}(I_1^i - I_2^i)^2}$$

RMSE represents the light source spectral similarity indicator corresponding to the combination. $I_1^i$ is a light intensity of a wavelength i on a spectrum of a light source in one group of second information in the combination, $I_2^i$ is a light intensity of a wavelength i on a spectrum of a light source in the other group of second information in the combination, and N represents a quantity of common wavelengths on the spectra of the light sources in the two groups of second information. The smaller the light source spectral similarity indicator, the greater a light source spectral similarity.

The foregoing is the process of calculating a light source spectral similarity indicator.

Through calculation in the first aspect, an average color distance corresponding to a combination may be obtained, and through calculation in the second aspect, a light source spectral similarity indicator corresponding to the combination may be obtained. A correspondence between the average color distance and the light source spectral similarity indicator may be used as a two-dimensional data point corresponding to the combination.

The foregoing processing is performed on $N*C_M^2$ combinations to obtain $N*C_M^2$ two-dimensional data points.

The foregoing is the process of calculating a two-dimensional data point.

The following describes a process of determining a classification standard.

A two-dimensional intersection graph is drawn based on the $N*C_M^2$ two-dimensional data points. A horizontal coordinate represents a light source spectral similarity indicator, and a vertical coordinate represents an average color distance. The classification standard is determined based on distribution of the $N*C_M^2$ two-dimensional data points in the graph.

An example is as follows.

Figure 12:
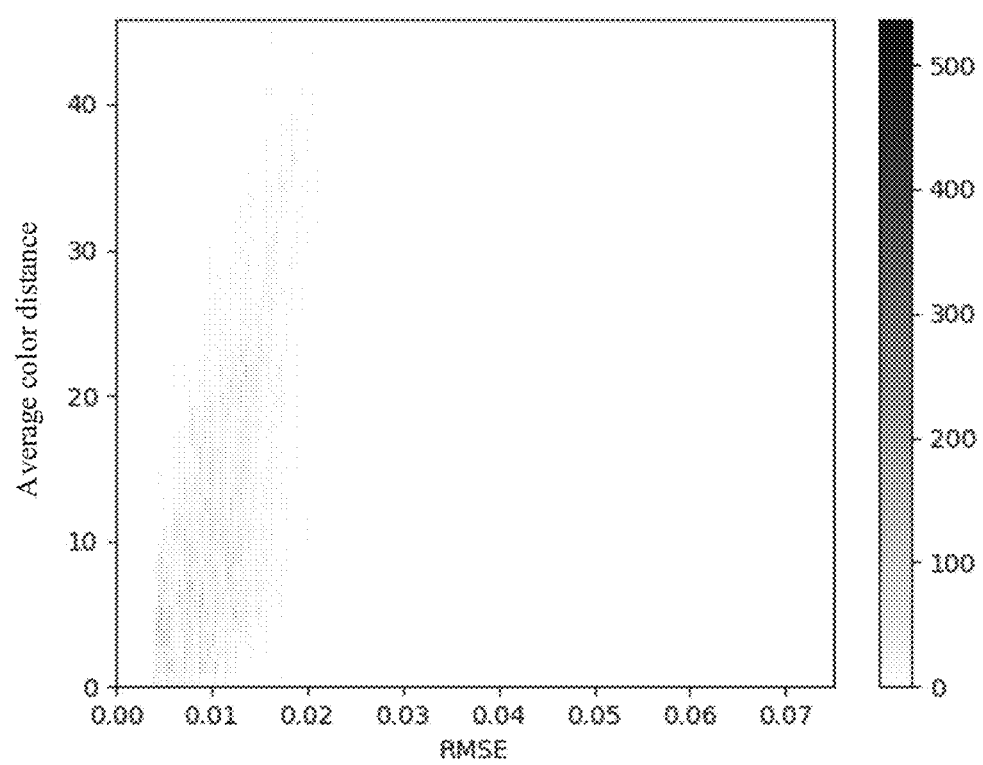
FIG. 12 is a two-dimensional intersection graph according to an embodiment of this application.

By drawing the foregoing $N*C_M^2$ two-dimensional data points on a graph, a two-dimensional intersection graph shown in FIG. 12 is obtained. A threshold, for example, 95%, may be preset. When an average color distance is less than 5 degrees, a color difference between two images is not significant. 5 degrees may be used as a preset value, and a first parameter is determined from a horizontal coordinate of the two-dimensional intersection graph, so that a proportion of two-dimensional point data points whose vertical coordinates are less than the preset value and whose horizontal coordinates are less than the first parameter exceeds the preset threshold, and the first parameter may be used as the foregoing classification standard. Refer to FIG. 12. If a proportion of two-dimensional point data points whose vertical coordinates are less than 5 degrees and whose horizontal coordinates are less than 0.004 exceeds 95%, 0.004 may be used as the classification standard.

The foregoing is the process of determining a classification standard.

The following describes a process of performing cluster analysis on spectra of M light sources based on a classification standard.

Cluster analysis is performed on the spectra of the M light sources by using a k-means clustering algorithm (k-means clustering algorithm, k-means). In a cluster analysis process, it is ensured that a light source spectral similarity indicator between any two cluster centers is greater than the foregoing classification standard. In each cluster, a light source spectral similarity indicator between any two light sources is less than the foregoing classification standard, and a quantity of light source types and light source types corresponding to the M light sources are obtained.

Figure 13:
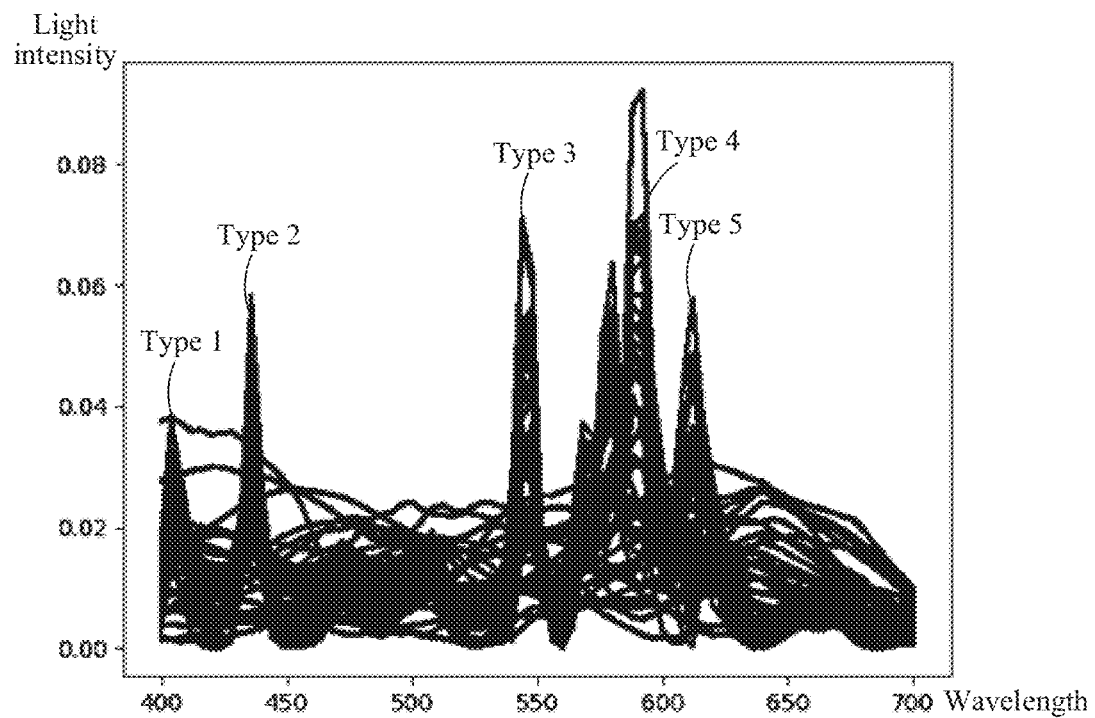
FIG. 13 is a schematic diagram of a clustering result according to an embodiment of this application.

For example, FIG. 13 shows a clustering result. Refer to FIG. 13. Five types of light sources are obtained through the foregoing cluster analysis. A type 1, a type 2, a type 3, a type 4, and a type 5 are used as examples.

The foregoing is the process of performing cluster analysis on spectra of M light sources based on a classification standard.

The following describes a process of obtaining a training sample based on a classification result and a data set.

The training sample may be obtained based on first information in each group of data in the data set and a light source type corresponding to a light source in each photographing scene.

When structures of a first model are different, training samples that need to be obtained are different. The following describes several possible design structures of the first model.

Figure 14:
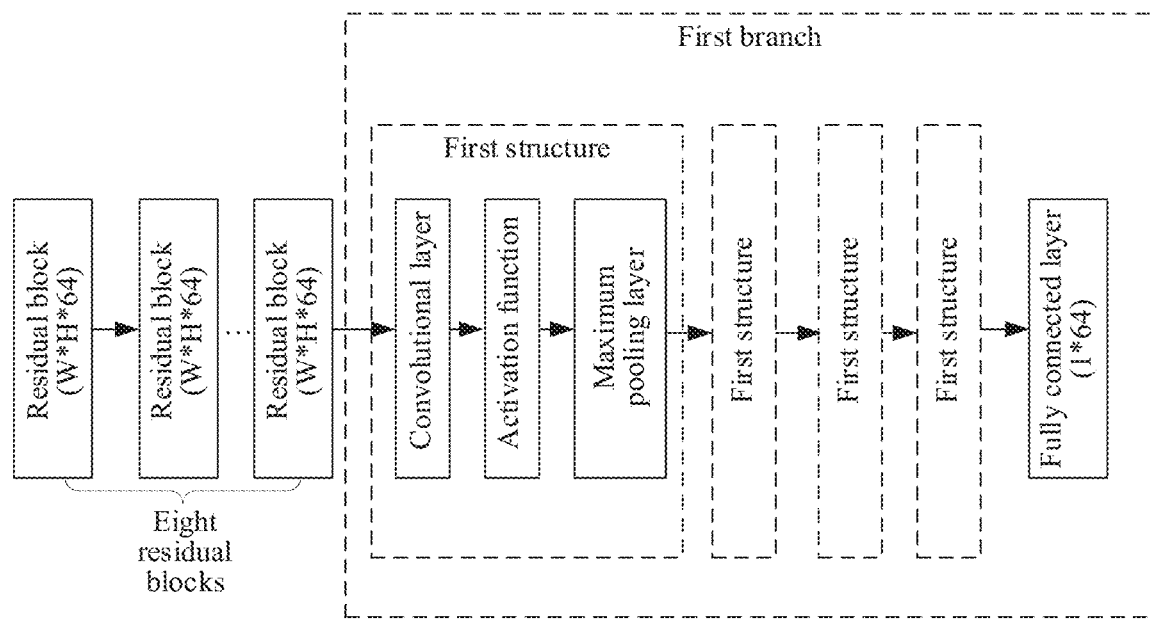
FIG. 14 is a first schematic diagram of a structure of a first model according to an embodiment of this application.

In a possible implementation, refer to FIG. 14. The first model includes eight residual blocks and a first branch. By inputting the original image obtained in S601 and/or the light intensity of the light received by each pixel on the first multispectral sensor obtained in S602 into a first residual block, through processing of the eight residual blocks and the first branch, the first branch outputs the probability that the light source in the current photographing scene belongs to each type of light sources.

Refer to FIG. 14. The first branch is converted into a fully connected layer through four times of downsampling of a first structure, and the first structure includes a convolutional layer, an activation function, and a maximum pooling layer. The convolutional layer may be C (3, 3, 64), where C (3, 3, 64) represents a convolutional layer with 64 channels and a core size of 3*3, the activation function may use ReLu, and the maximum pooling layer may be Max_pool2d (2, 2), where Max_pool2d (2, 2) represents a maximum pooling layer with a core size of 2*2. A size of the fully connected layer is (1*a quantity of spectral types). A loss function of the first branch is cross entropy. A quantity of training samples, namely, a batch size, captured in a training is 64, an optimizer is Adam, a learning rate complies with polynomial attenuation, and an initial value of the learning rate is $1\times10^{-5}$. The quantity of spectral types is set to a quantity obtained through the foregoing cluster analysis.

It should be noted that the foregoing four times of downsampling are merely an example, and a quantity of times of downsampling is not limited in this application.

Figure 15:
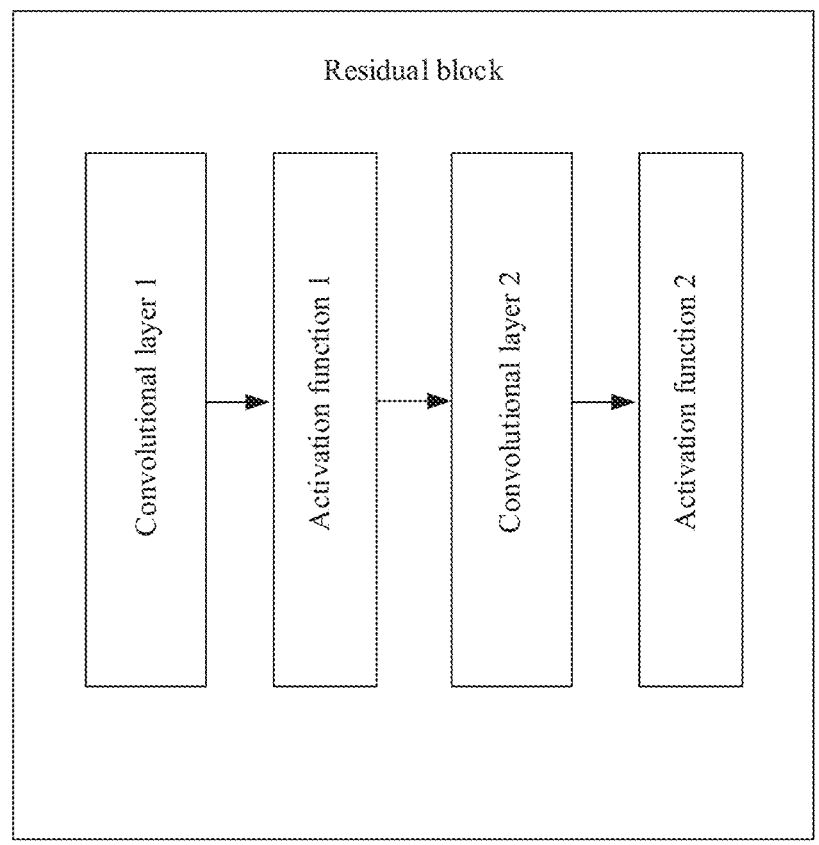
FIG. 15 is a schematic diagram of a structure of a residual block according to an embodiment of this application.

Refer to FIG. 15. An image size of each residual block is W*H*64. W and H are a width and height of an image, and 64 indicates a quantity of channels. Each residual block includes a convolutional layer 1, an activation function 1, a convolutional layer 2, and an activation function 2. The convolutional layer 1 and the convolutional layer 2 may be C (3, 3, 64), and the activation function 1 and the activation function 2 may use ReLu.

When the first model shown in FIG. 14 is trained, data included in the training sample needs to include: an original image generated by the RGB sensor, a light intensity of light received by each pixel on the first multispectral sensor, and a light source type. First information in each group of data and a light source type corresponding to a light source in a corresponding photographing scene may be used as a training sample. A group of data in M×N groups of data in a data set is used as an example. It is assumed that a cluster analysis result is: a light source type corresponding to the group of data is a type A, an original image generated by the RGB sensor in the group of data is an original image A. and a light intensity of light received by each pixel on the first multispectral sensor in the group of data is a vector A. In this case, the original image A, the vector A, and the type A form a training sample, as shown in Table 1.

TABLE 1

| Training sample | Original image A | Vector A | Type A |
| --- | --- | --- | --- |

During training of the first model, a quantity of samples in a batch is input each time, a gradient is calculated, a model parameter is updated, and the model is optimal through a plurality of times of iteration.

Figure 16:
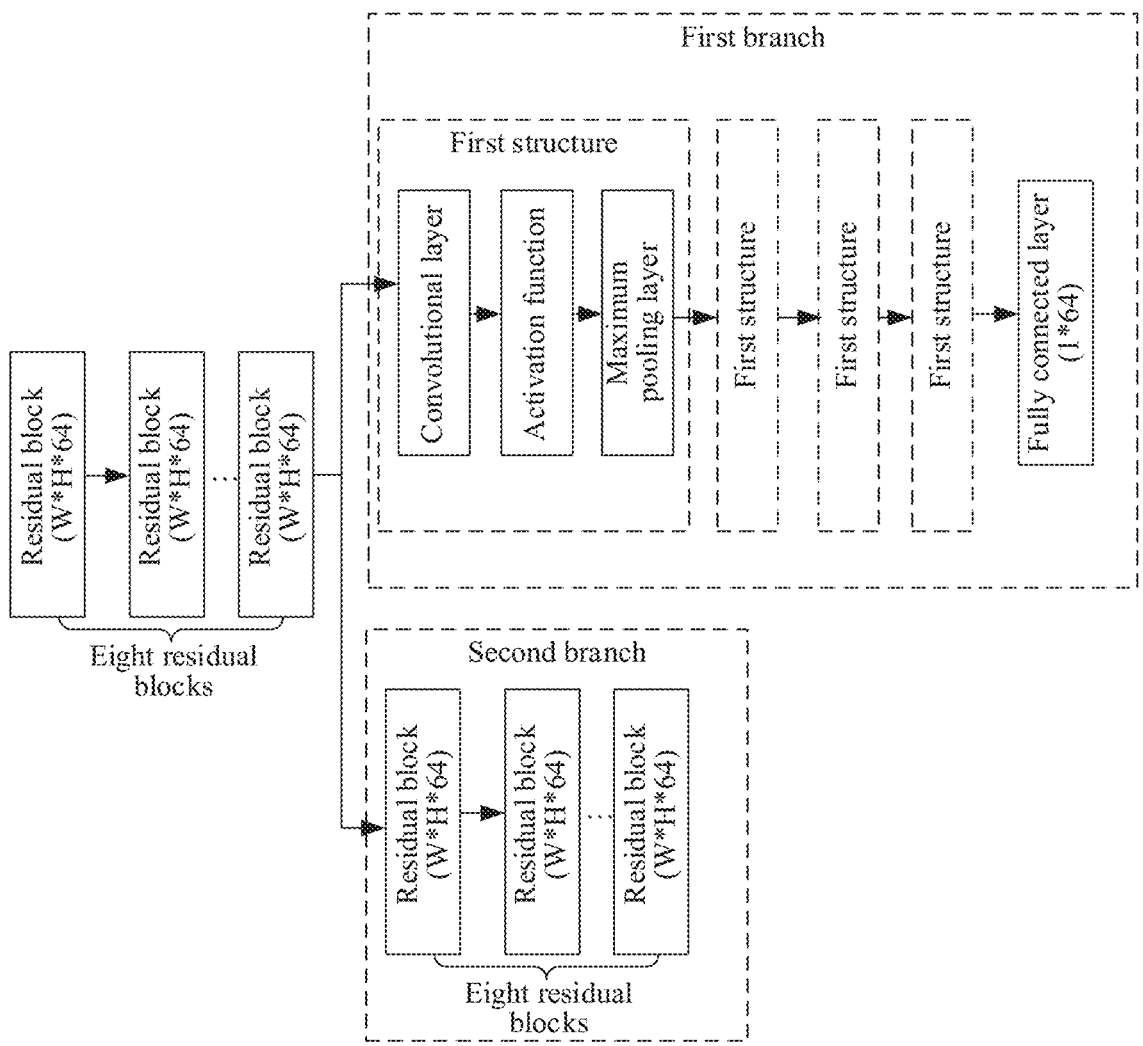
FIG. 16 is a second schematic diagram of a structure of a first model according to an embodiment of this application.

In another possible implementation, refer to FIG. 16. The first model includes eight residual blocks, a first branch, and a second branch. By inputting the original image obtained in S601 and/or the light intensity of the light received by each pixel on the first multispectral sensor obtained in S602 into a first residual block, the first branch outputs the probability that the light source in the current photographing scene belongs to each type of light source, and the second branch outputs the object material reflectivity spectrum corresponding to each pixel in the current photographing scene.

For structures of the eight residual blocks and the first branch, refer to FIG. 14 and FIG. 15. Details are not described herein again in this embodiment. The second branch includes eight residual blocks, and a structure of each residual block is the same as a structure of the residual block shown in FIG. 15. A loss function of the second branch is L2. A batch size is set to 64, an optimizer is Adam, a learning rate complies with polynomial attenuation, an initial value of the learning rate is set to be $1\times10^{-1}$, and the object material reflectivity spectrum is 31 channels.

It should be noted that the eight residual blocks included in the second branch are merely an example, and a quantity of residual blocks in the second branch is not limited in this application.

When the first model shown in FIG. 16 is trained, data included in the training sample needs to include: an original image generated by the RGB sensor, a light intensity of light received by each pixel on the first multispectral sensor, a light source type, and an object material reflectivity spectrum corresponding to each pixel on the second multispectral sensor. First information in each group of data, a light source type corresponding to a light source in a corresponding photographing scene, and the object material reflectivity spectrum corresponding to each pixel on the second multispectral sensor in the corresponding photographing scene may be used as a training sample. A group of data in M×N groups of data in a data set is used as an example. It is assumed that a cluster analysis result is: a light source type corresponding to the group of data is a type A, an original image generated by the RGB sensor in the group of data is an original image A, a light intensity of light received by each pixel on the first multispectral sensor in the group of data is a vector A1, and an object material reflectivity spectrum corresponding to each pixel on the second multispectral sensor in the group of data is a vector A2. In this case, the original image A, the vector A1, the vector A2, and the type A form a training sample, as shown in Table 2.

TABLE 2

| Training sample | Original image A | Vector A1 | Vector A2 | Type A |
|---|---|---|---|---|

During training of the first model, a quantity of samples in a batch is input each time, a gradient is calculated, a model parameter is updated, and the model is optimal through a plurality of times of iteration.

Figure 17:
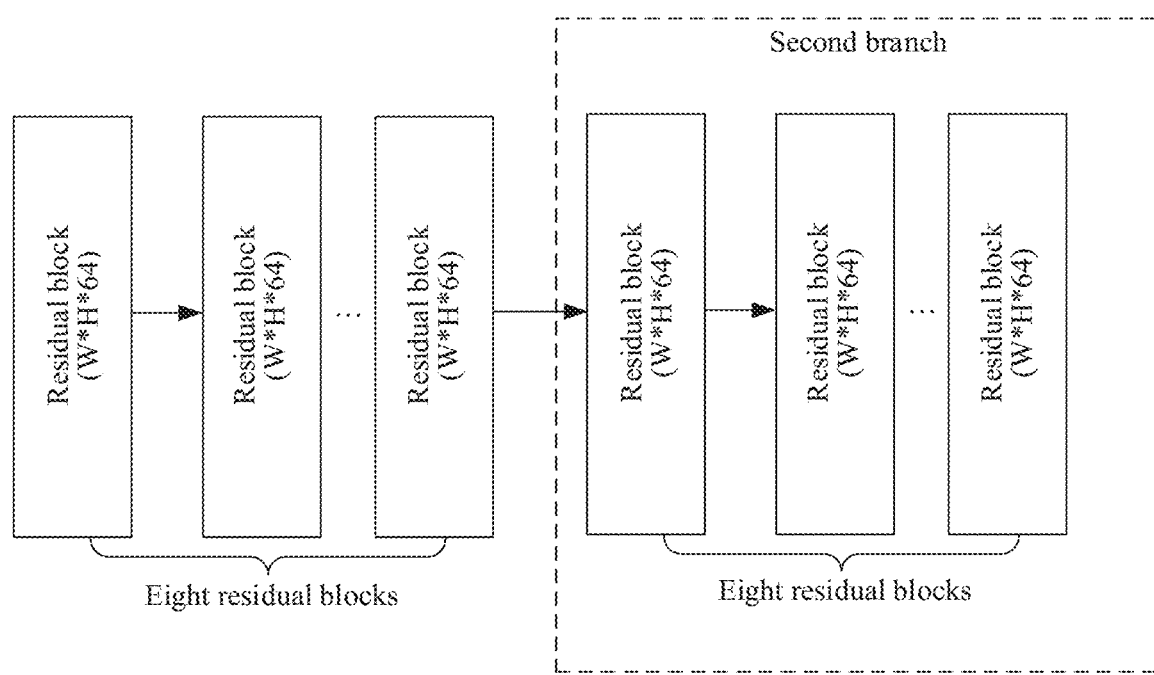
FIG. 17 is a third schematic diagram of a structure of a first model according to an embodiment of this application.

In still another possible implementation, refer to FIG. 17. The first model may include eight residual blocks and a second branch. By inputting the original image obtained in S601 and/or the light intensity of the light received by each pixel on the first multispectral sensor obtained in S602 into a first residual block, the second branch outputs the object material reflectivity spectrum corresponding to each pixel on the RGB sensor.

For structures of the eight residual blocks, refer to FIG. 15. For a structure of the second branch, refer to FIG. 16. Details are not described herein again in this embodiment.

When the first model shown in FIG. 17 is trained, data included in the training sample needs to include: an original image generated by the RGB sensor, a light intensity of light received by each pixel on the first multispectral sensor, and an object material reflectivity spectrum corresponding to each pixel on the second multispectral sensor. The original image generated by the RGB sensor, the light intensity of the light received by each pixel on the first multispectral sensor, and the object material reflectivity spectrum corresponding to each pixel on the second multispectral sensor may be extracted from the foregoing constructed data set. A group of data in M×N groups of data in the data set is used as an example. An original image generated by the RGB sensor in the group of data is an original image A, a light intensity of light received by each pixel on the first multispectral sensor in the group of data is a vector A1, and an object material reflectivity spectrum corresponding to each pixel on the second multispectral sensor in the group of data is a vector A2. In this case, the original image A, the vector A1, and the vector A2 form a training sample, as shown in Table 3.

TABLE 3

| Training sample | Original image A | Vector A1 | Vector A2 |
|---|---|---|---|

S604: Determine a spectrum of a light source in the current photographing scene based on the probability that the light source in the current photographing scene belongs to each type of light source and a spectrum of each type of light source.

In a possible implementation, summation is performed on the spectrum of each type of light source by using the probability that the light source in the current photographing scene belongs to each type of light source as a weighted sum weight, to obtain the spectrum of the light source in the current photographing scene.

In a possible implementation, the spectrum of each type of light source may be a spectrum of each cluster center obtained through the foregoing cluster analysis.

Descriptions are provided below by using examples.

Figure 18:
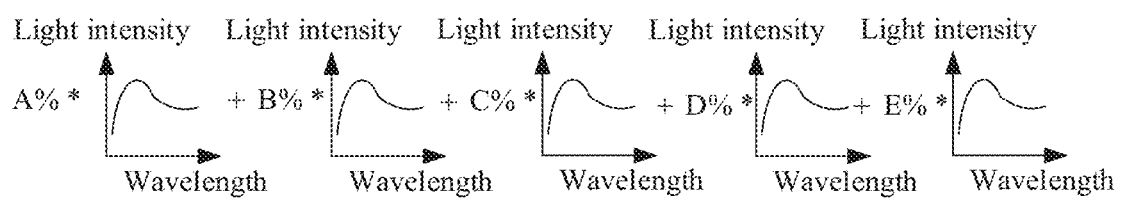
FIG. 18 is a principle diagram of calculating a spectrum of a light source in a current photographing scene according to an embodiment of this application.

Assuming that five types of light sources are obtained through the foregoing cluster analysis, probabilities that light sources in the current photographing scene belong to various types of light sources are A/o, B %. C %. D %, and E % respectively. The spectrum of each type of light source is shown in FIG. 18. By using A %, B %, C %, D %, and E % as weighted sum weights, the spectrum of the light source in the current photographing scene is obtained in a manner in FIG. 18.

As described above, an input of the first model may be the original image generated by the RGB sensor, or may be the light intensity of the light received by each pixel on the first multispectral sensor, or may be the original image generated by the RGB sensor and the light intensity of the light received by each pixel on the first multispectral sensor. When the input of the first model is different, an output of the first model is different, and the spectrum obtained in S604 is also correspondingly different. For each input, a light source spectral similarity indicator between the spectrum obtained in S604 and the spectrum actually measured by the illuminometer is calculated. For example, Table 4 shows light source spectral similarity indicators corresponding to three inputs. In Table 4, the light intensity of the light received by each pixel on the first multispectral sensor is referred to as a light intensity for short, and the original image generated by the RGB sensor is referred to as an original image for short. It can be learned from Table 4 that, compared with only inputting the original image generated by the RGB sensor or the light intensity of the light received by each pixel on the first multispectral sensor, when both the original image generated by the RGB sensor and the light intensity of the light received by each pixel on the first multispectral sensor are input into the first model, the light source spectrum determined in S604 is most similar to the spectrum actually measured by the illuminometer.

TABLE 4

| Input | RMSE |
|---|---|
| Original image | 0.0057 |
| Original image + light intensity | 0.0038 |
| Light intensity | 0.0041 |

Figure 5:
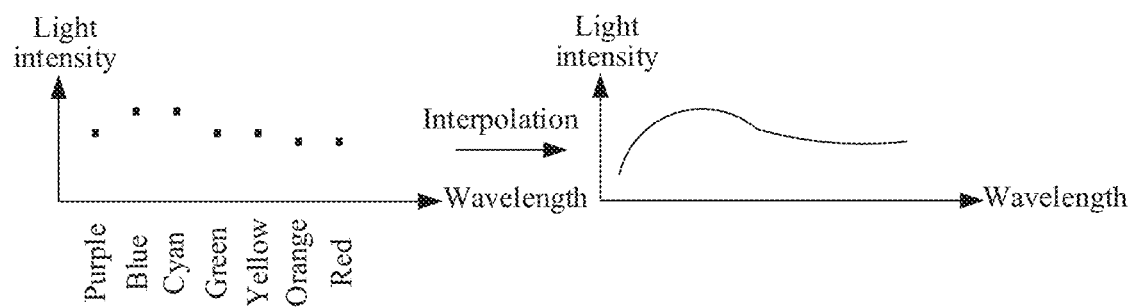
FIG. 5 is a principle diagram of obtaining a light source spectrum by using a multispectral sensor according to an embodiment of this application.
Figure 19:
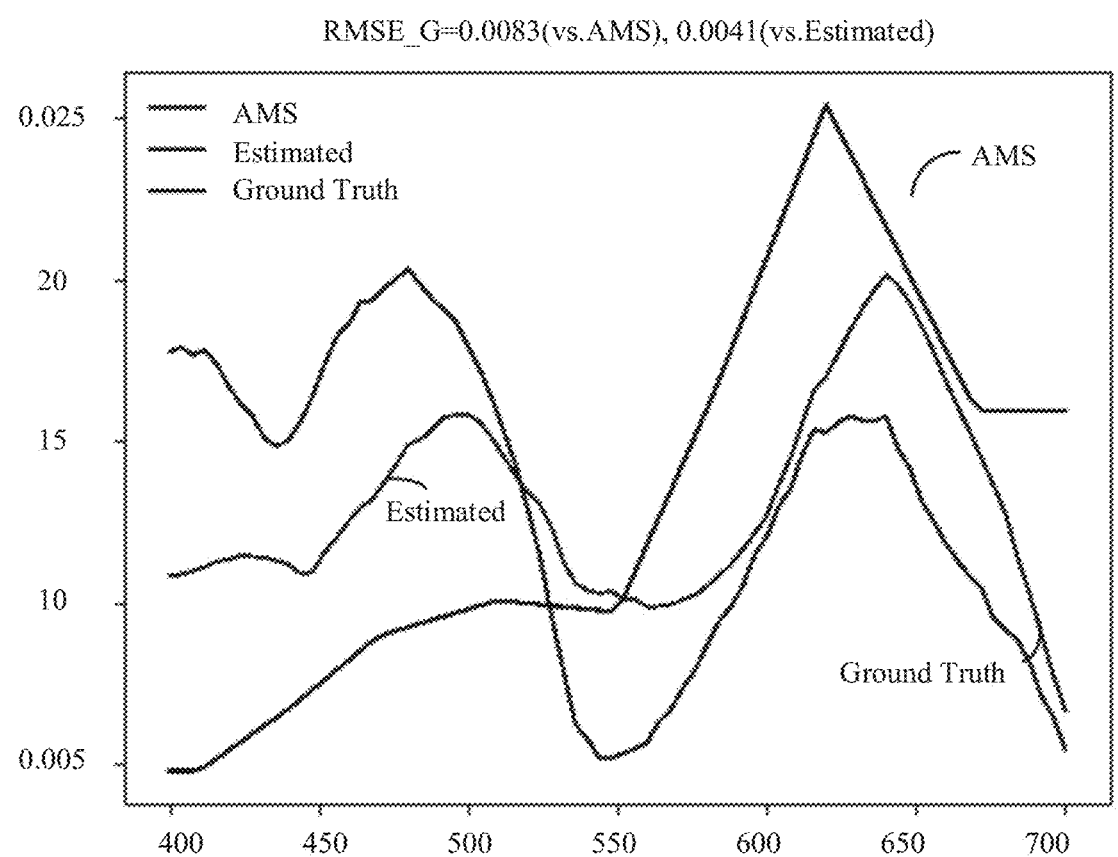
FIG. 19 is a first diagram of comparing a light source spectrum obtained by using a first model and a light source spectrum obtained in a manner shown in FIG. 5 according to an embodiment of this application.

FIG. 19 shows a first diagram of comparing a light source spectrum obtained by using a first model and a light source spectrum obtained in a manner shown in FIG. 5. In FIG. 19, AMS is the light source spectrum obtained in the manner shown in FIG. 5, Estimated is the light source spectrum obtained by using the first model, and Ground Truth is a light source spectrum actually measured by an illuminometer. A horizontal coordinate is a wavelength, and a vertical coordinate is a normalized light intensity value. Through calculation, a light source spectral similarity indicator RMSE_G between the AMS and the Ground Truth is 0.0083, and a light source spectral similarity indicator RMSE_G between the Estimated and the Ground Truth is 0.0041. It can be seen that, compared with the light source spectrum obtained in the manner shown in FIG. 5, the light source spectrum obtained by using the first model is closer to the light source spectrum actually measured by the illuminometer.

Figure 20:
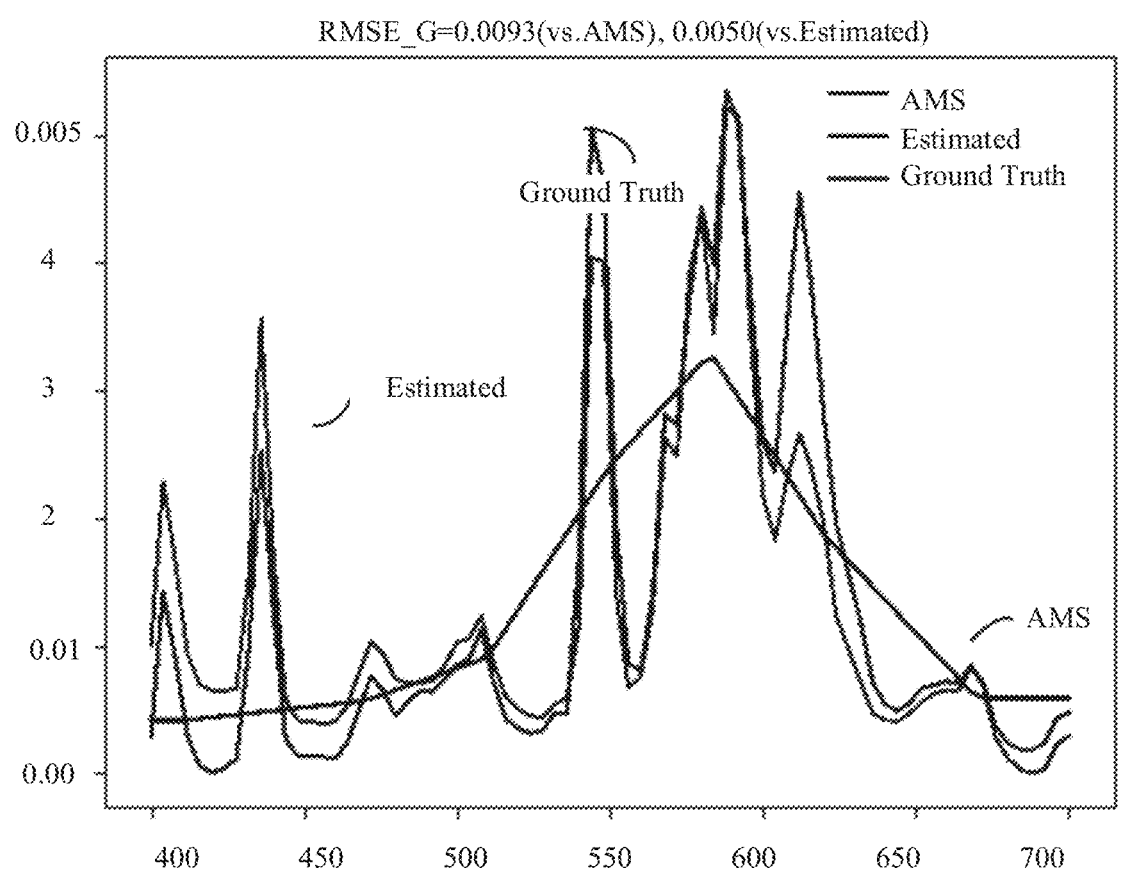
FIG. 20 is a second diagram of comparing a light source spectrum obtained by using a first model and a light source spectrum obtained in a manner shown in FIG. 5 according to an embodiment of this application.

FIG. 20 shows a second diagram of comparing a light source spectrum obtained by using a first model and a light source spectrum obtained in a manner shown in FIG. 5. Similarly, in FIG. 15, AMS is the light source spectrum obtained in the manner shown in FIG. 5, Estimated is the light source spectrum obtained by using the first model, and Ground Truth is a light source spectrum actually measured by an illuminometer. A horizontal coordinate is a wavelength, and a vertical coordinate is a normalized light intensity value. Through calculation, a similarity indicator RMSE_G between the AMS and the Ground Truth is 0.0093, and a similarity indicator RMSE_G between the Estimated and the Ground Truth is 0.0050. It can be seen that, compared with the light source spectrum obtained in the manner shown in FIG. 5, the light source spectrum obtained by using the first model is closer to the light source spectrum actually measured by the illuminometer.

Because the light source spectrum obtained by using the first model is close to a real light source spectrum, by performing white balance processing and color correction processing based on the light source spectrum, a color of an image is closer to a real color of a to-be-photographed object, thereby improving user experience.

This application provides a method for obtaining a light source spectrum. After a user triggers to turn on a camera of a terminal device, an RGB sensor on a mobile phone generates an original image of a current photographing scene. In addition, a multispectral sensor on the mobile phone records a light intensity of light received by each pixel on the multispectral sensor, and inputs the original image generated by the RGB sensor and/or the light intensity of the light received by each pixel on the multispectral sensor into a pre-trained model. The model outputs a probability that a light source in the current photographing scene belongs to each type of light source, uses the probability as a weighted sum weight, and determines a spectrum of the light source in the current photographing scene based on the weighted sum weight and a spectrum of each type of light source. Because a light source spectrum obtained by using this method is close to a real light source spectrum, by performing white balance processing and color correction processing based on the light source spectrum, a color of an image is closer to a real color of a to-be-photographed object, thereby improving user experience.

Figure 21:
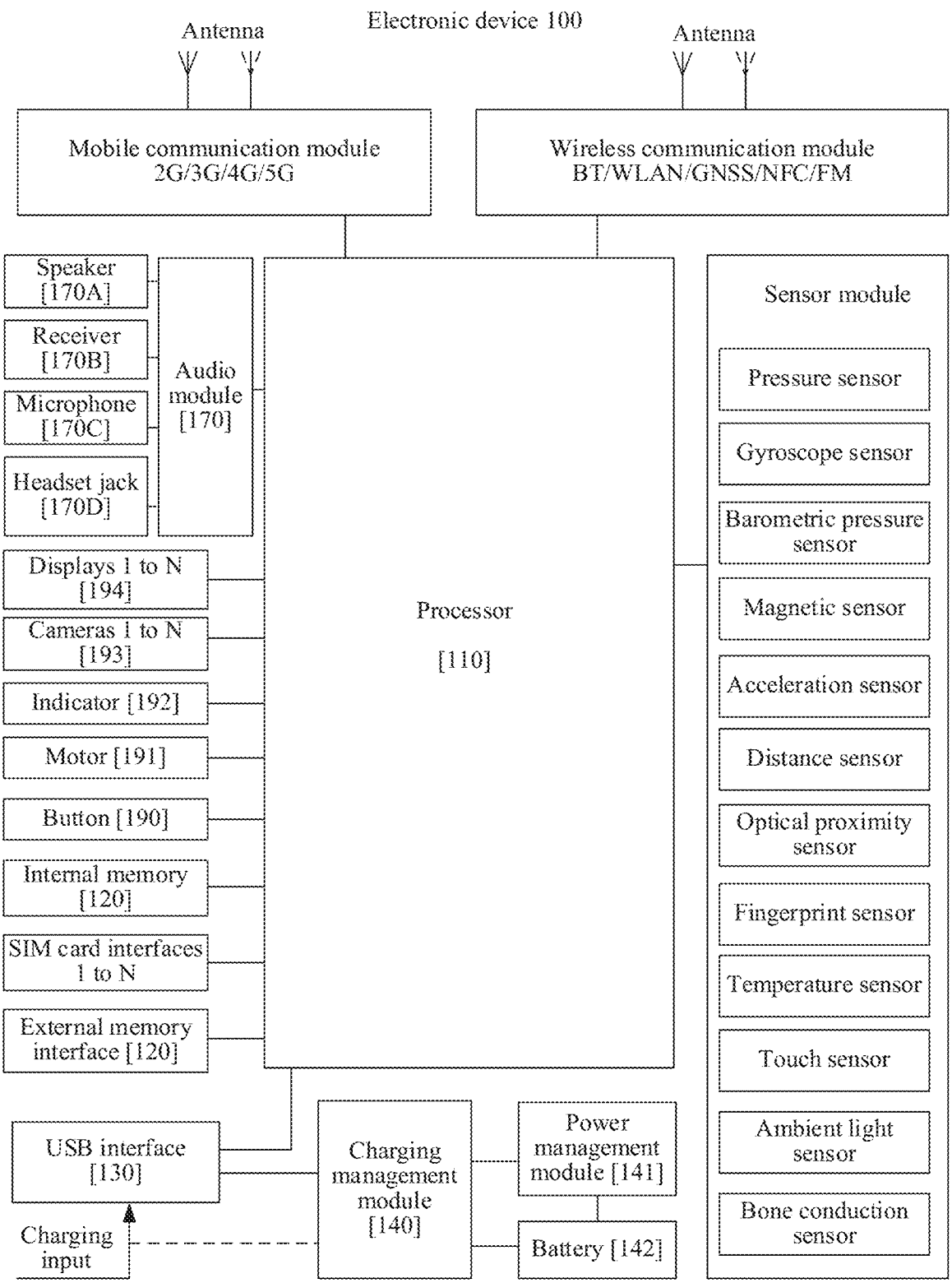
FIG. 21 is a schematic diagram of a structure of an electronic device 100 according to an embodiment of this application.

FIG. 21 is a schematic diagram of a structure of an electronic device 100. The electronic device 100 may include a processor 110, an external memory interface 120, an internal memory 121, a universal serial bus (universal serial bus. USB) interface 130, a charging management module 140, a power management module 141, a battery 142, an audio module 170, a speaker 170A, a receiver 170B, a microphone 170C, a headset jack 170D, a button 190, a motor 191, an indicator 192, a camera 193, a display 194, and the like.

The camera 193 includes an RGB sensor, a multispectral sensor, and an ISP processor. Both the RGB sensor and the multispectral sensor are connected to the ISP processor. The RGB sensor is configured to generate an original image of a current photographing scene, and the multispectral sensor is configured to record a light intensity of light received by each pixel on the multispectral sensor.

In a possible implementation, a first model is installed in the RGB sensor, the RGB sensor is connected to the multispectral sensor, and the multispectral sensor sends the recorded light intensity of light received by each pixel to the RGB sensor. After generating the original image of the current photographing scene, the RGB sensor inputs first information into the first model, to obtain a probability that a light source in the current photographing scene belongs to each type of light source. The RGB sensor further determines a spectrum of the light source in the current photographing scene based on the probability that the light source in the current photographing scene belongs to each type of light source and a spectrum of each type of light source, and sends the spectrum of the light source to the ISP processor, to guide a process of white balance processing and color correction processing.

In another possible implementation, a first model is installed in the multispectral sensor, the RGB sensor is connected to the multispectral sensor, and the RGB sensor sends the generated original image of the current photographing scene to the multispectral sensor. The multispectral sensor records a light intensity of light received by each pixel on the multispectral sensor, and inputs first information into the first model, to obtain a probability that a light source in the current photographing scene belongs to each type of light source. The multispectral sensor further determines a spectrum of the light source in the current photographing scene based on the probability that the light source in the current photographing scene belongs to each type of light source and a spectrum of each type of light source, and sends the spectrum of the light source to the ISP processor, to guide a process of white balance processing and color correction processing.

In another possible implementation, a first model is installed in the ISP processor, and both the RGB sensor and the multispectral sensor are connected to the ISP processor. The multispectral sensor sends the recorded light intensity of light received by each pixel to the ISP processor. The RGB sensor sends the generated original image of the current photographing scene to the ISP processor. The ISP processor inputs first information to the first model, to obtain a probability that a light source in the current photographing scene belongs to each type of light source, and further determines a spectrum of the light source in the current photographing scene based on the probability that the light source in the current photographing scene belongs to each type of light source and a spectrum of each type of light source. The spectrum of the light source is for guiding a process of white balance processing and color correction processing.

In another possible implementation, a first model is installed in the processor 110, and both the RGB sensor and the multispectral sensor are connected to the processor 110. The multispectral sensor sends the recorded light intensity of light received by each pixel to the processor 110. The RGB sensor sends the generated original image of the current photographing scene to the processor 110. The processor 110 inputs first information to the first model, to obtain a probability that a light source in the current photographing scene belongs to each type of light source, further determines a spectrum of the light source in the current photographing scene based on the probability that the light source in the current photographing scene belongs to each type of light source and a spectrum of each type of light source, and sends the spectrum of the light source to the ISP processor, to guide a process of white balance processing and color correction processing.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor. AP), a modem processor, a graphics processing unit (graphics processing unit, GPU), an image signal processor (image signal processor, ISP), a controller, a video codec, a digital signal processor (digital signal processor, DSP), a baseband processor, a neural processing unit (neural processing unit, NPU), and/or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit. I2C) interface, an inter-integrated circuit sound (inter-integrated circuit sound, I2S) interface, a pulse code modulation (pulse code modulation. PCM) interface, a universal asynchronous receiver/transmitter (universal asynchronous receiver/transmitter, UART) interface, a mobile industry processor interface (mobile industry processor interface. MIPI), a general-purpose input/output (general-purpose input/output, GPIO) interface, a subscriber identity module (subscriber identity module. SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface. CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIP interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device such as an AR device.

It may be understood that an interface connection relationship between the modules that is shown in this embodiment of the present disclosure is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scene. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs instructions stored in the internal memory 121 and/or instructions stored in the memory disposed in the processor, to perform various function applications and data processing of the electronic device 100.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for obtaining a light source spectrum comprising:
   obtaining first information in a current photographing scene, wherein the first information comprises at least one of a first image generated by a red, green, and blue (RGB) sensor or a light intensity of a light received by each pixel on a first multispectral sensor;
   inputting the first information into a first model to obtain a probability that a first light source in the current photographing scene belongs to each type of light source; and
   determining a first spectrum of the first light source based on the probability and a second spectrum of each type of light source.

2. The method of claim 1, wherein before inputting the first information into the first model, the method further comprises:
   obtaining a training sample comprising second information in different photographing scenes and light source types corresponding to light sources in the different photographing scenes; and
   training the first model using the training sample.

3. The method of claim 2, further comprising:
   constructing a data set comprising M×N groups of data, wherein each of the M×N groups of data corresponds to a photographing scene, wherein each photographing scene corresponds to a second light source and a to-be-photographed object, wherein M is a quantity of light sources, wherein N is a quantity of to-be-photographed objects, and wherein each of the M×N groups of data comprises third information in a corresponding photographing scene;
   performing cluster analysis on spectra of M light sources in the data set to obtain a light source type corresponding to the second light source; and
   further obtaining the training sample based on the third information and the light source type.

4. The method of claim 3, wherein each of the M×N groups of data further comprises fourth information, wherein the fourth information comprises a third spectrum of a third light source in a corresponding photographing scene and an object material reflectivity spectrum corresponding to each pixel on a second multispectral sensor in the corresponding photographing scene, and wherein preforming the cluster analysis comprises:
   obtaining the fourth information in each of the M×N groups of data to obtain M×N groups of fourth information; and
   further performing the cluster analysis on the spectra based on the M×N groups of fourth information.

5. The method of claim 4, wherein performing the cluster analysis on the spectra further comprises:
   determining a classification standard of the M light sources based on the M×N groups of fourth information; and
   further performing the cluster analysis on the spectra based on the classification standard.

6. The method of claim 5, wherein determining the classification standard comprises:
   selecting, for each to-be-photographed object in the N to-be-photographed objects, any two groups of fourth information from M groups of fourth information corresponding to the to-be-photographed object to obtain $N*C_M^2$ combinations;

calculating, for each combination, a two-dimensional data point corresponding to a related combination to obtain $N*C_M^2$ two-dimensional data points, wherein the two-dimensional data point comprises an average color distance and a light source spectral similarity indicator; and further determining the classification standard based on the $N*C_M^2$ two-dimensional data points.

7. The method of claim 6, further comprising:
calculating a first RGB value of each pixel based on one group of fourth information in the related combination;
calculating a second RGB value of each pixel based on a remaining group of fourth information in the related combination; and
determining, based on the first RGB value and the second RGB value, the average color distance corresponding to the related combination.

8. The method of claim 6, further comprising determining, based on a fourth spectrum of a fourth light source comprised in one group of fourth information in the related combination and a fifth spectrum of a fifth light source comprised in a remaining group of fourth information in the related combination, the light source spectral similarity indicator corresponding to the related combination.

9. The method of claim 6, further comprising:
drawing a two-dimensional intersection graph based on the $N*C_M^2$ two-dimensional data points;
determining a first parameter from a horizontal coordinate of the two-dimensional intersection graph to make a proportion of two-dimensional data points comprising vertical coordinates less than a preset value and horizontal coordinates less than the first parameter that exceed a preset threshold; and
setting the first parameter as the classification standard.

10. The method of claim 5, wherein performing the cluster analysis on the spectra further comprises performing the cluster analysis on the spectra using a k-means clustering algorithm, wherein a light source spectral similarity indicator between any two cluster centers is greater than the classification standard, and wherein in each cluster, a spectral similarity indicator between any two light sources is less than the classification standard.

11. The method of claim 3, wherein the first model comprises a branch configured to output the probability, and wherein the method further comprises setting the third information and the light source type as the training sample.

12. The method of claim 3, wherein the first model comprises a first branch configured to output the probability and a second branch configured to output an object material reflectivity spectrum corresponding to each pixel in the current photographing scene, and wherein the method further comprises setting the third information, the light source type, and the object material reflectivity spectrum corresponding to each pixel on a second multispectral sensor in the corresponding photographing scene as the training sample.

13. The method of claim 12, wherein the first branch comprises a first structure and a fully connected layer, wherein the method further comprises converting the first structure into the fully connected layer through downsampling for L times, wherein the first structure comprises a first convolutional layer, a first activation function, and a maximum pooling layer, wherein a first loss function of the first branch is cross entropy, wherein L is greater than or equal to 1, wherein the second branch comprises P residual blocks, wherein each of the P residual blocks comprises a second convolutional layer, a second activation function, a third convolutional layer, and a third activation function, wherein a second loss function of the second branch is L2, and wherein P is greater than or equal to 1.

14. The method of claim 1, further comprising performing a summation on the second spectrum using the probability as a weighted sum weight to obtain the first spectrum.

15. An electronic device comprising:
a red, green, and blue (RGB) sensor configured to generate a first image;
a multispectral sensor comprising a plurality of pixels configured to receive a light; and
one or more processors coupled to the RGB sensor and the multispectral sensor and configured to:
obtain first information in a current photographing scene, wherein the first information comprises at least one of the first image or a light intensity of the light;
input the first information into a first model to obtain a probability that a first light source in the current photographing scene belongs to each type of light source; and
determine a first spectrum of the first light source based on the probability and a second spectrum of each type of light source.

16. The electronic device of claim 15, wherein before inputting the first information into the first model, the one or more processors are further configured to:
obtain a training sample comprising second information in different photographing scenes and light source types corresponding to light sources in the different photographing scenes; and
train the first model using the training sample.

17. The electronic device of claim 16, wherein the one or more processors are further configured to:
construct a data set comprising M×N groups of data, wherein each of the M×N groups of data corresponds to a photographing scene, wherein each photographing scene corresponds to a second light source and a to-be-photographed object, wherein M is a quantity of light sources, wherein N is a quantity of to-be-photographed objects, and wherein each of the M×N groups of data comprises third information in a corresponding photographing scene;
perform cluster analysis on spectra of M light sources in the data set to obtain a light source type corresponding to the second light source; and
further obtain the training sample based on the third information and the light source type.

18. The electronic device of claim 17, further comprising a second multispectral sensor comprising a plurality of second pixels, wherein each of the M×N groups of data further comprises fourth information, wherein the fourth information comprises a third spectrum of a third light source in a corresponding photographing scene and an object material reflectivity spectrum corresponding to each of the second pixels, and wherein the one or more processors are further configured to:
obtain the fourth information in each of the M×N group of data to obtain M×N groups of fourth information; and
further perform the cluster analysis on the spectra based on the M×N groups of fourth information.

19. The electronic device of claim 18, wherein the one or more processors are further configured to:

determine a classification standard of the M light sources in the data set based on the M×N groups of forth information; and further perform the cluster analysis on the spectra based on the classification standard.

20. The electronic device of claim 19, wherein the one or more processors are further configured to:

select, for each to-be-photographed object in the N to-be-photographed objects, any two groups of fourth information from M groups of fourth information corresponding to the to-be-photographed object to obtain $N*C_M^2$ combinations;

calculate, for each combination, a two-dimensional data point corresponding to a related combination to obtain $N*C_M^2$ two-dimensional data points, wherein the two-dimensional data point comprises an average color distance and a light source spectral similarity indicator; and further determine the classification standard based on the $N*C_M^2$ two-dimensional data points.

* * * * *